United States Patent [19]

Ishida et al.

[11] Patent Number: 6,141,729
[45] Date of Patent: *Oct. 31, 2000

[54] DATA TRANSFER SYSTEM WHICH DIVIDES DATA AMONG TRANSFER UNITS HAVING DIFFERENT TRANSFER SPEED CHARACTERISTICS

[75] Inventors: Hideo Ishida, Katanosi; Toshiyuki Ochiai, Ibarakisi; Yutaka Tanaka, Zyoutouku; Teruto Hirota, Morigutisi; Akihiko Wada, Sagamiharashi; Eiichi Toyonaga, Ikomashi; Kunihiko Sakoda, Neyagawashi, all of Japan

[73] Assignee: Matsushita Electric Industrial Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/723,872

[22] Filed: Sep. 23, 1996

[51] Int. Cl.[7] ................................ G06F 12/02
[52] U.S. Cl. ............................ 711/114; 711/137
[58] Field of Search .................. 711/114, 137, 711/4; 709/230, 236

[56] References Cited

U.S. PATENT DOCUMENTS

| | | | |
|---|---|---|---|
| 5,051,982 | 9/1991 | Brown et al. | 370/381 |
| 5,315,504 | 5/1994 | Lamble | 700/90 |
| 5,459,458 | 10/1995 | Richardson et al. | 340/825.52 |
| 5,483,647 | 1/1996 | Yu et al. | 713/100 |
| 5,689,678 | 11/1997 | Stallmo et al. | 711/114 |
| 5,721,861 | 2/1998 | Ohizumi | 711/114 |
| 5,761,526 | 6/1998 | Sakakura et al. | 711/114 |
| 5,835,940 | 11/1998 | Yorimitsu et al. | 711/114 |

FOREIGN PATENT DOCUMENTS

| | | |
|---|---|---|
| 4-341035 | 11/1992 | Japan . |
| 7-64733 | 3/1995 | Japan . |
| 7-254911 | 10/1995 | Japan . |
| 8-18947 | 1/1996 | Japan . |

OTHER PUBLICATIONS

"Multiple access server for moving picture information", NTT review vol. 5, No. 5, Sept. 1993.

*Primary Examiner*—Reginald G. Bragdon
*Attorney, Agent, or Firm*—Parkhurst & Wendel, L.L.P.

[57] ABSTRACT

A data transfer system comprises a plurality of terminals; a plurality of high-speed data transfer units connected to the terminals through a network, each data transfer unit comprising a plurality of storage devices and a storage device group control device or unit for controlling readout of data from the storage devices, and dividing and storing data requested by the terminals; a virtual storage device group controlling device or unit for controlling readout of data from virtual storage device groups, each virtual storage device group being constructed by selecting a storage device from each high-speed data transfer unit; and an instruction conversion unit or device for receiving a data readout instruction on the basis of data requests output from the terminals, which instruction is given to the virtual storage device groups, from the virtual storage device group control unit or device, and converting the instruction into a data readout instruction to the storage devices from the storage device group control unit or device. In this data transfer system, the load for the data transfer processing is equally distributed among the high-speed data transfer units even when data transfer requests are output from plural terminals.

15 Claims, 20 Drawing Sheets

Fig.4

| virtual storage device group block No. | storage device group | storage device group block No. | virtual storage device group block No. | storage device group | storage device group block No. | virtual storage device group block No. | storage device group | storage device group block No. | virtual storage device group block No. | storage device group | storage device group block No. |
|---|---|---|---|---|---|---|---|---|---|---|---|
| 0 | 2-1 | 0 | 0 | 2-1 | 64 | 0 | 2-1 | 128 | 0 | 2-1 | 192 |
|  | 2-2 | 0 |  | 2-2 | 64 |  | 2-2 | 128 |  | 2-2 | 192 |
|  | 2-3 | 0 |  | 2-3 | 64 |  | 2-3 | 128 |  | 2-3 | 192 |
|  | 2-4 | 0 |  | 2-4 | 64 |  | 2-4 | 128 |  | 2-4 | 192 |
| 4 | 2-1 | 1 | 4 | 2-1 | 65 | 4 | 2-1 | 129 | 4 | 2-1 | 193 |
|  | 2-2 | 1 |  | 2-2 | 65 |  | 2-2 | 129 |  | 2-2 | 193 |
|  | 2-3 | 1 |  | 2-3 | 65 |  | 2-3 | 129 |  | 2-3 | 193 |
|  | 2-4 | 1 |  | 2-4 | 65 |  | 2-4 | 129 |  | 2-4 | 193 |
| ... | ... | ... | ... | ... | ... | ... | ... | ... | ... | ... | ... |
| virtual storage device group 8-1 | | | virtual storage device group 8-2 | | | virtual storage device group 8-3 | | | virtual storage device group 8-4 | | |

Fig.5

| storage device group block No. | storage device | storage device block No. | storage device group block No. | storage device | storage device block No. | storage device group block No. | storage device | storage device block No. | storage device group block No. | storage device | storage device block No. |
|---|---|---|---|---|---|---|---|---|---|---|---|
| 0 | 1-1 | 0 | 0 | 1-5 | 0 | 0 | 1-9 | 0 | 0 | 1-13 | 0 |
| 1 | | 1 | 1 | | 1 | 1 | | 1 | 1 | | 1 |
| ... | | ... | ... | | ... | ... | | ... | ... | | ... |
| 64 | 1-2 | 0 | 64 | 1-6 | 0 | 64 | 1-10 | 0 | 64 | 1-14 | 0 |
| 65 | | 1 | 65 | | 1 | 65 | | 1 | 65 | | 1 |
| ... | | ... | ... | | ... | ... | | ... | ... | | ... |
| 128 | 1-3 | 0 | 128 | 1-7 | 0 | 128 | 1-11 | 0 | 128 | 1-15 | 0 |
| 129 | | 1 | 129 | | 1 | 129 | | 1 | 129 | | 1 |
| ... | | ... | ... | | ... | ... | | ... | ... | | ... |
| 192 | 1-4 | 0 | 192 | 1-8 | 0 | 192 | 1-12 | 0 | 192 | 1-16 | 0 |
| 193 | | 1 | 193 | | 1 | 193 | | 1 | 193 | | 1 |
| ... | | ... | ... | | ... | ... | | ... | ... | | ... |
| storage device group 2-1 | | 14-1 | storage device group 2-2 | | 14-2 | storage device group 2-3 | | 14-3 | storage device group 2-4 | | 14-4 |

14

Fig.17 (a)    Prior Art
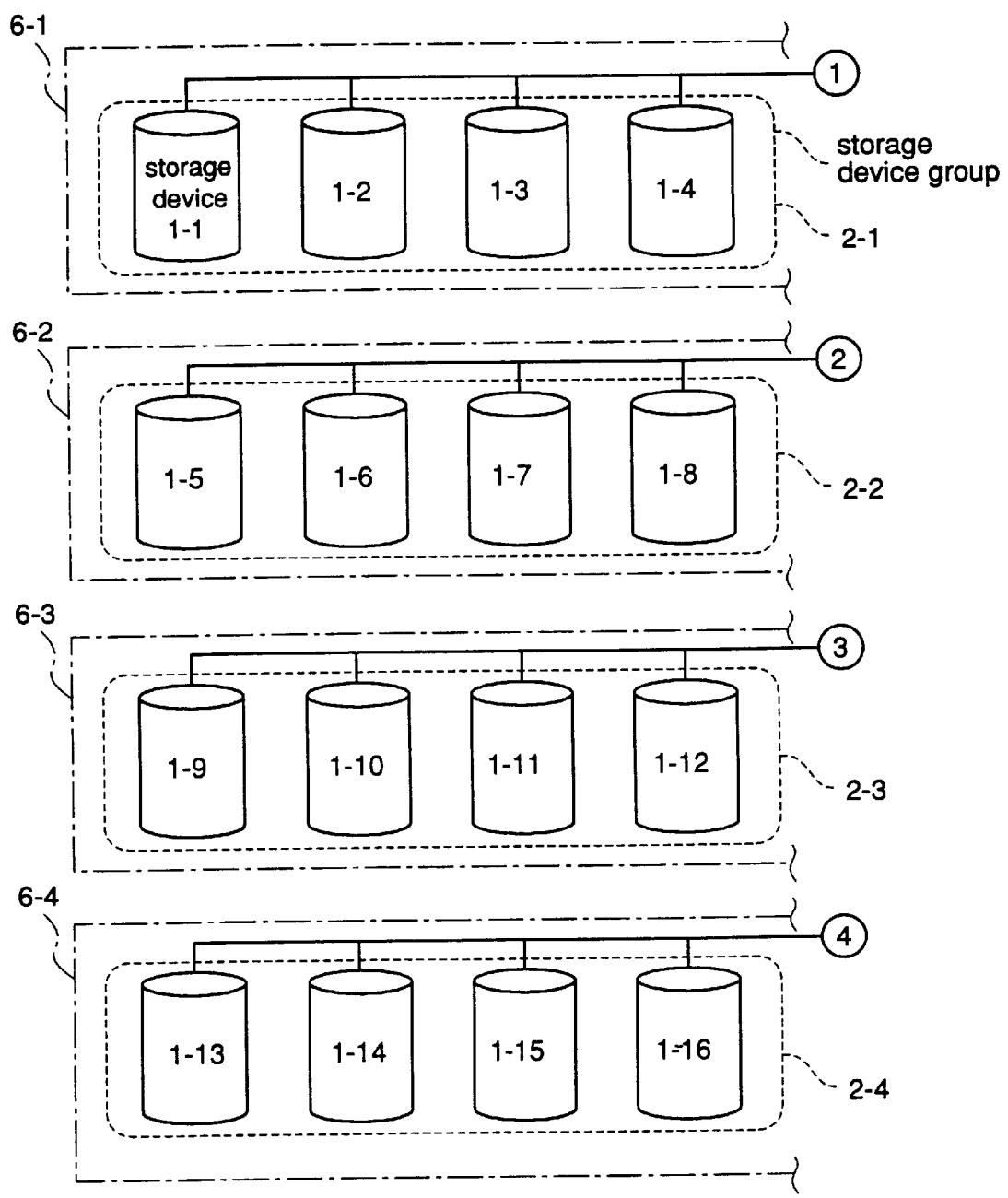

Fig.17 (b)  Prior Art
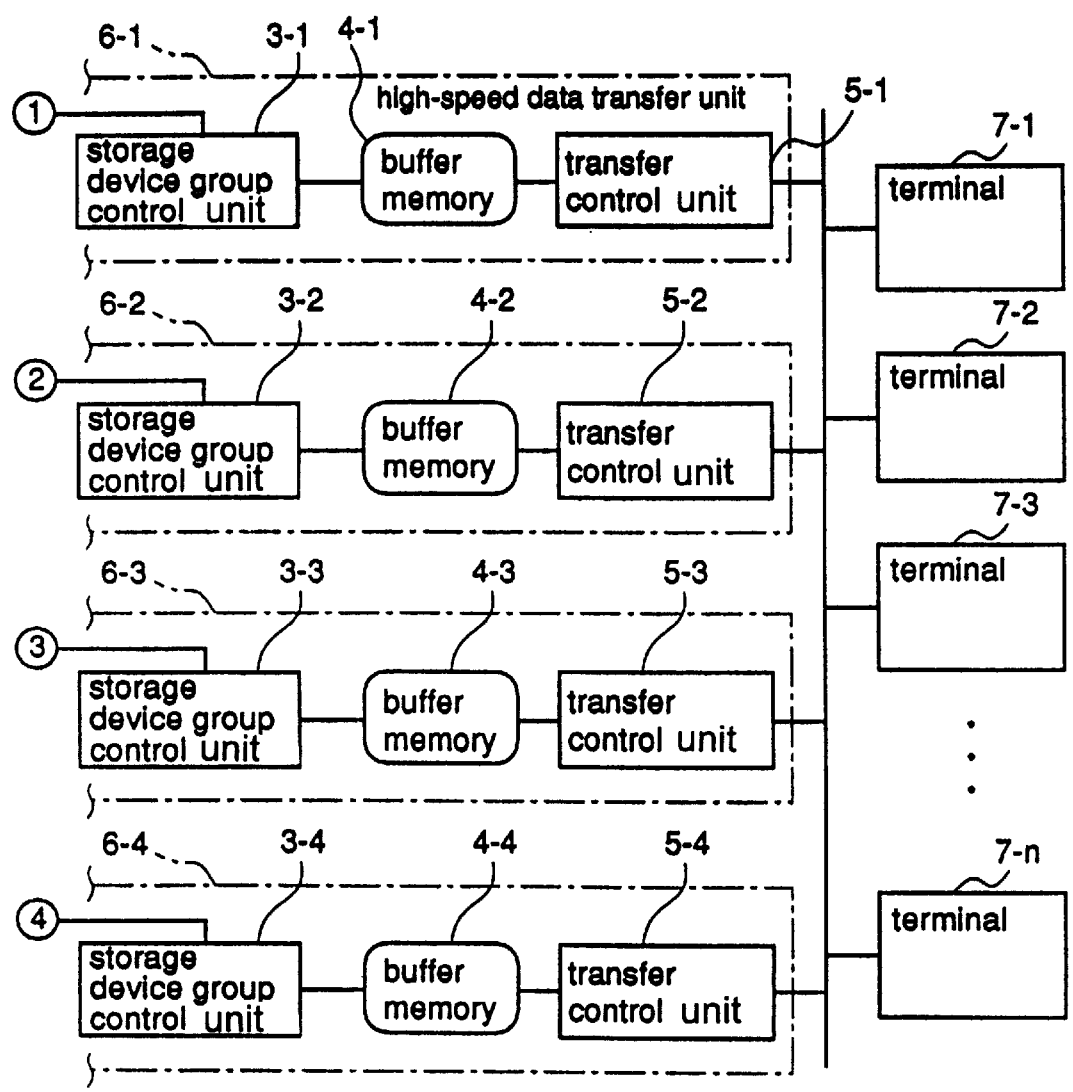

6,141,729

DATA TRANSFER SYSTEM WHICH DIVIDES DATA AMONG TRANSFER UNITS HAVING DIFFERENT TRANSFER SPEED CHARACTERISTICS

FIELD OF THE INVENTION

The present invention relates to a data transfer system for transferring data stored in a server, such as a file server or a video server, to a client or a terminal equipment connected to the server through a network.

BACKGROUND OF THE INVENTION

FIGS. 17(a) and 17(b) are block diagrams illustrating a data transfer system disclosed in Japanese Published Patent Application No. Hei. 7-64733. In these figures, reference numerals 1-1 to 1-4 designate storage devices, each comprising media, such as an HDD, a CR-ROM, and an optical disk. These storage devices 1-1 to 1-4 constitute a storage device group 2-1. A storage device group controlling unit 3-1 for controlling data readout and the like is connected to the storage device group 21. A buffer memory 4-1 temporarily stores data read out from the storage device group 2-1 by the storage device group controlling unit 3-1. A transfer control unit 5-1 transfers data stored in the buffer memory 4-1 to a terminal connected to the data transfer system through a network. The storage device group 2-1, the storage device group controlling means 3-1, the buffer memory 4-1, and the transfer control means 5-1 constitute a high-speed data transfer unit 6-1. Reference numerals 6-2 to 6-4 designate high-speed data transfer units having the same structure as the high-speed data transfer unit 6-1. Reference numerals 7-1 to 7-n designate terminals connected to the transfer control unit 5-1 to 5-4 of the high-speed data transfer units 6-1 to 6-4.

In the prior art data transfer system so constructed, data is divided into a plurality of blocks each having a prescribed size, for example, 256 K bytes, and is successively stored in the storage device groups 2-1 to 2-4. In the storage device group 2-1, the 256 K byte data block is divided equally into four, i.e., four 64 K byte data blocks, and these data blocks are respectively stored in the storage devices 1-1 to 1-4. Likewise, each of the storage device groups 2-2 to 2-4 stores data of 256 K bytes.

When the terminal 7-1 makes a request for data transfer to the high-speed data transfer units 6-1 to 6-4 and the data requested by the terminal 7-1 are stored in the storage device group 2-1, the storage device group control unit 3-1 reads out the data stored in the storage devices 1-1 to 1-4 and then stores the data in the buffer memory 4-1. Thereafter, the transfer control unit 5-1 transfers the data stored in the buffer memory 4-1 to the terminal 7-1.

When the terminals 7-2 and 7-3 make requests for data transfer, at the same time, to the high-speed data transfer units 6-1 to 6-4 and the data requested by the terminals 7-2 and 7-3 are stored in the storage device group 2-1, the storage device group control unit 3-1 reads out the data requested by the terminals 7-2 and 7-3, which data is stored in the storage devices 1-1 to 1-4, and then stores the data in the buffer memory 4-1. Thereafter, the transfer control unit 5-1 transfers the requested data to the respective terminals 7-2 and 7-3.

In the above-mentioned prior art data transfer system, however, when a plurality of terminals request data transfer at the same time and the data requested by these terminals are stored in the same storage device group, in a high-speed data transfer unit including this storage device group, the storage device group control unit reads out the data requested by the respective terminals from the storage device group and sends the data to the buffer memory, and the transfer control unit transfers the data in the buffer memory to the respective terminals.

Therefore, even though the data transfer system includes a plurality of high-speed data transfer units, when the data requested by those terminals is stored in a storage device group, the load for the data transfer processing is unfavorably concentrated in a high-speed data transfer unit including the storage device group.

SUMMARY OF THE INVENTION

An object of the present invention is to provide a data transfer system that can equally distribute the load for the data transfer processing among a plurality of high-speed data transfer units when a plurality of terminals request data transfer.

Other objects and advantages of the invention will become apparent from the detailed description that follows. The detailed description and specific embodiments described are provided only for illustration since various additions and modifications within the scope of the invention will be apparent to those of skill in the art from the detailed description.

According to an aspect of the present invention, a data transfer system comprises a plurality of terminals; a plurality of high-speed data transfer units connected to the terminals through a network, each data transfer unit comprising a plurality of storage devices and a storage device group control unit for controlling readout of data from the storage devices, and dividing and storing data requested by the terminals; a virtual storage device group control unit for controlling readout of data from virtual storage device groups, each virtual storage device group being constructed by selecting a storage device from each high-speed data transfer unit; and an instruction conversion unit for receiving a data readout instruction on the basis of data requests output from the terminals, which instruction is given to the virtual storage device groups, from the virtual storage device group control unit, and converting the instruction into a data readout instruction to the storage devices from the storage device group control unit. In this data transfer system, when data is transferred to the terminals from the high-speed data transfer units, the instruction conversion unit converts a data readout instruction to the virtual storage device groups from the virtual storage device group control unit into a data readout instruction to the storage device groups from the storage device group control unit. Receiving the converted data readout instruction, the storage device group control unit reads out data from the storage device groups and sends the data to the buffer memories, and the transfer control unit transfers the data in the buffer memories to the terminals. Thereby, the load for the data transfer processing is equally distributed among the high-speed data transfer units.

BRIEF DESCRIPTION OF THE DRAWINGS

FIG. 4 shows a virtual storage conversion table according to the first embodiment of the invention.

FIG. 5 shows a storage device group control table according to the first embodiment of the invention.

FIGS. 17(a) and 17(b) are block diagrams illustrating a data transfer system according to the prior art.

DETAILED DESCRIPTION OF THE PREFERRED EMBODIMENTS

[Embodiment 1]

Figure 1:
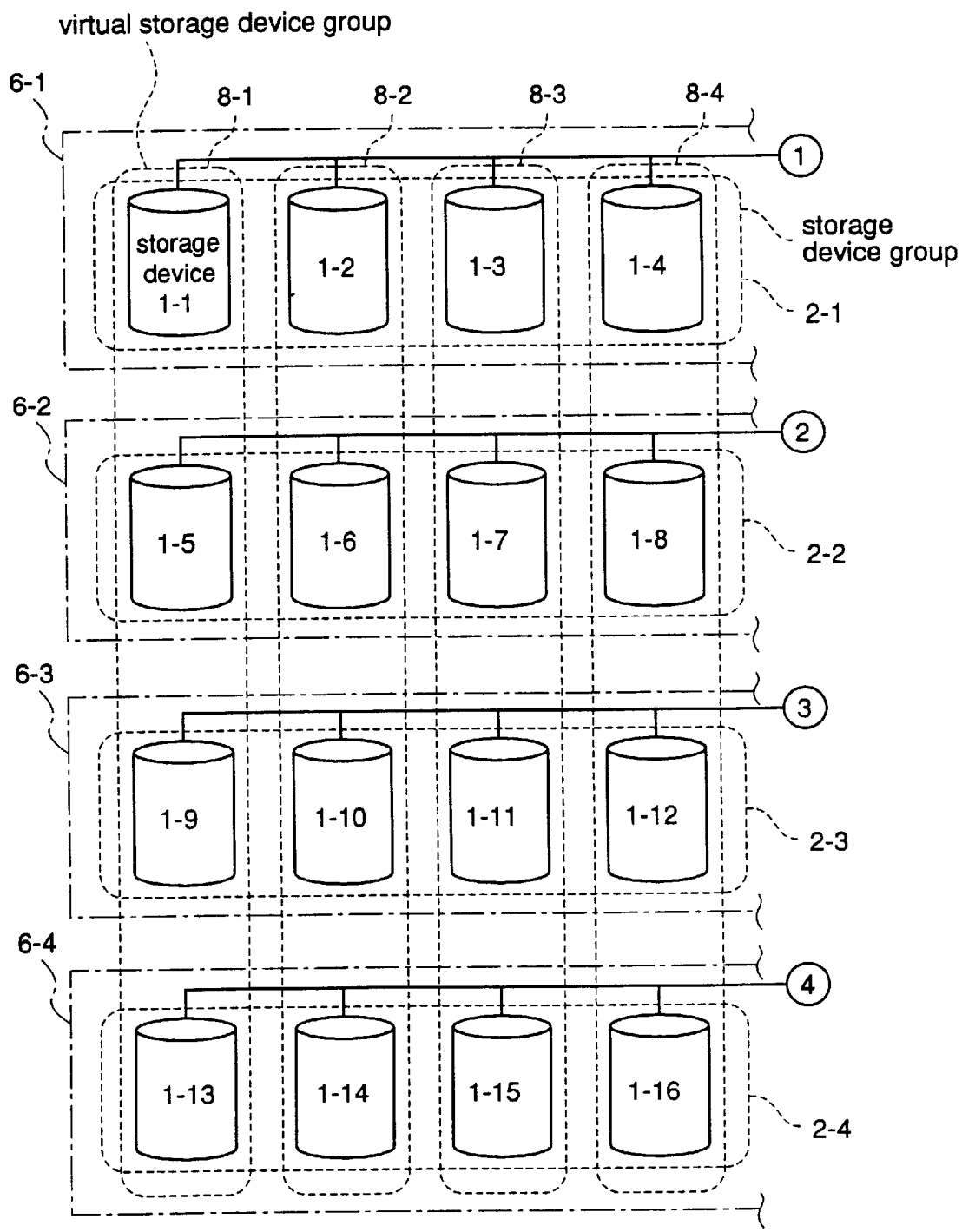
FIGS. 1(a) and 1(b) are block diagrams illustrating a data transfer system in accordance with a first embodiment of the present invention.
Figure 1:
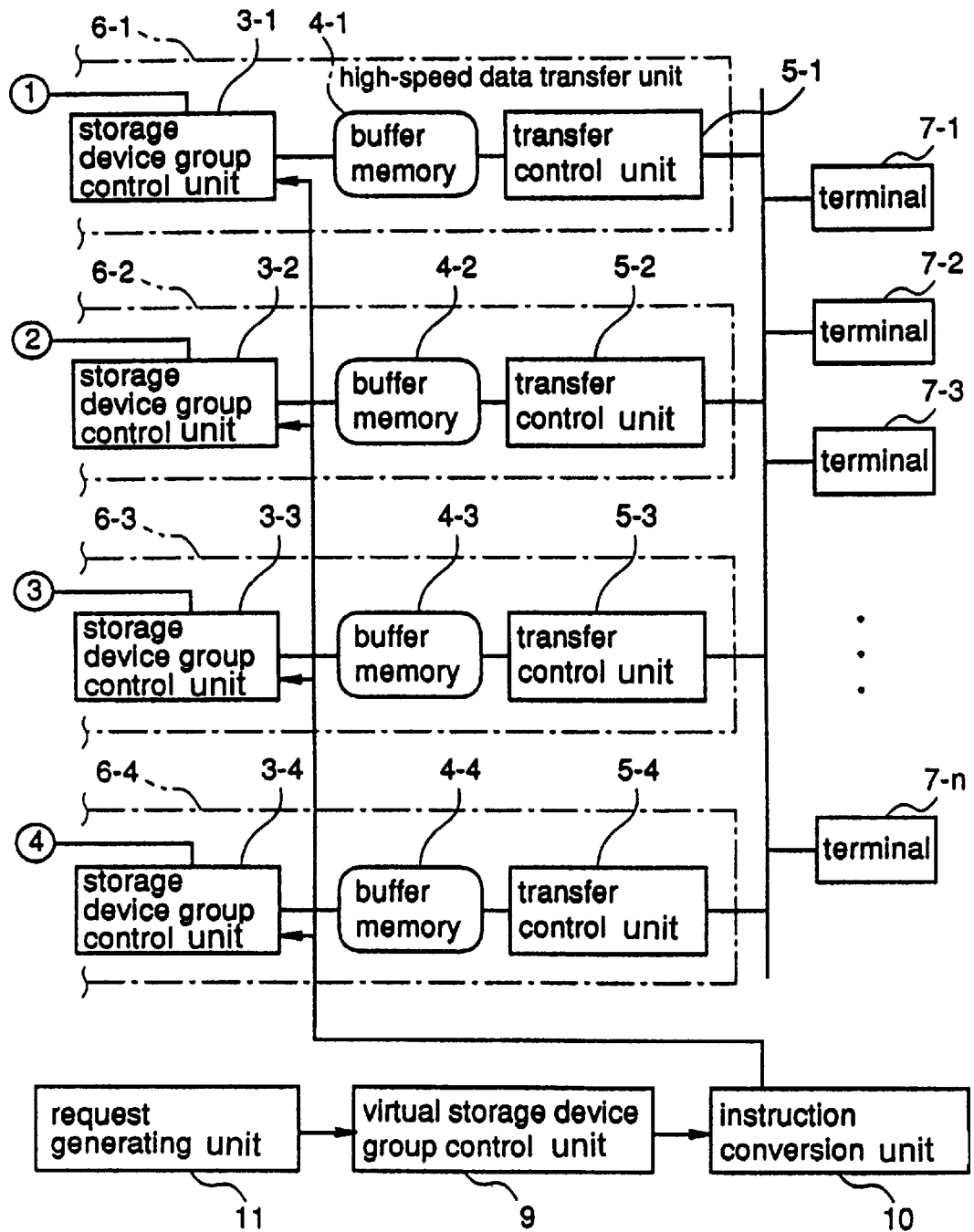

FIGS. 1(a) and 1(b) are block diagrams illustrating a data transfer system in accordance with a first embodiment of the present invention. In these figures, reference numerals 1-1 to 1-4 designate storage devices. These storage devices 1-1 to 1-4 constitute a storage device group 2-1. A storage device group controlling unit 3-1 for controlling data readout and the like is connected to the storage device group 2-1. A buffer memory 4-1 temporarily stores data read out from the storage device group 2-1 by the storage device group controlling unit 3-1. A transfer control unit 5-1 transfers data stored in the buffer memory 4-1 to a terminal connected to the data transfer system through a network. The storage device group 2-1, the storage device group controlling unit 3-1, the buffer memory 4-1, and the transfer control unit 5-1 constitute a high-speed data transfer unit 6-1. Reference numerals 6-2 to 6-4 designate high-speed data transfer units having the same structure as the high-speed data transfer unit 6-1. Reference numerals 7-1 to 7-n designate terminals connected to the transfer control unit 5-1 to 5-4 of the high-speed data transfer units 6-1 to 6-4.

Furthermore, reference numeral 8-1 designates a virtual storage device group virtually comprising the storage devices 1-1, 1-5, 1-9, and 1-13 included in the storage device groups 2-1, 2-2, 2-3, and 2-4, respectively. Likewise, reference numerals 8-2, 8-3, and 8-4 designate virtual storage device groups. A virtual storage device control unit 9 controls the virtual storage device groups 8-1 to 8-4. An instruction conversion unit 10 converts data readout instructions from the virtual storage device group control unit 9 to the virtual storage device groups 8-1 to 8-4, into data readout instructions from the storage device group control unit 3-1 to 3-4 to the real storage device groups 2-1 to 2-4, respectively, which control unit controls data transfer from the real storage device groups 2-1 to 2-4 to the buffer memories 4-1 to 4-4, respectively. A request generating unit 11 generates a request for data readout to the virtual storage device group control unit 9.

Figure 2:
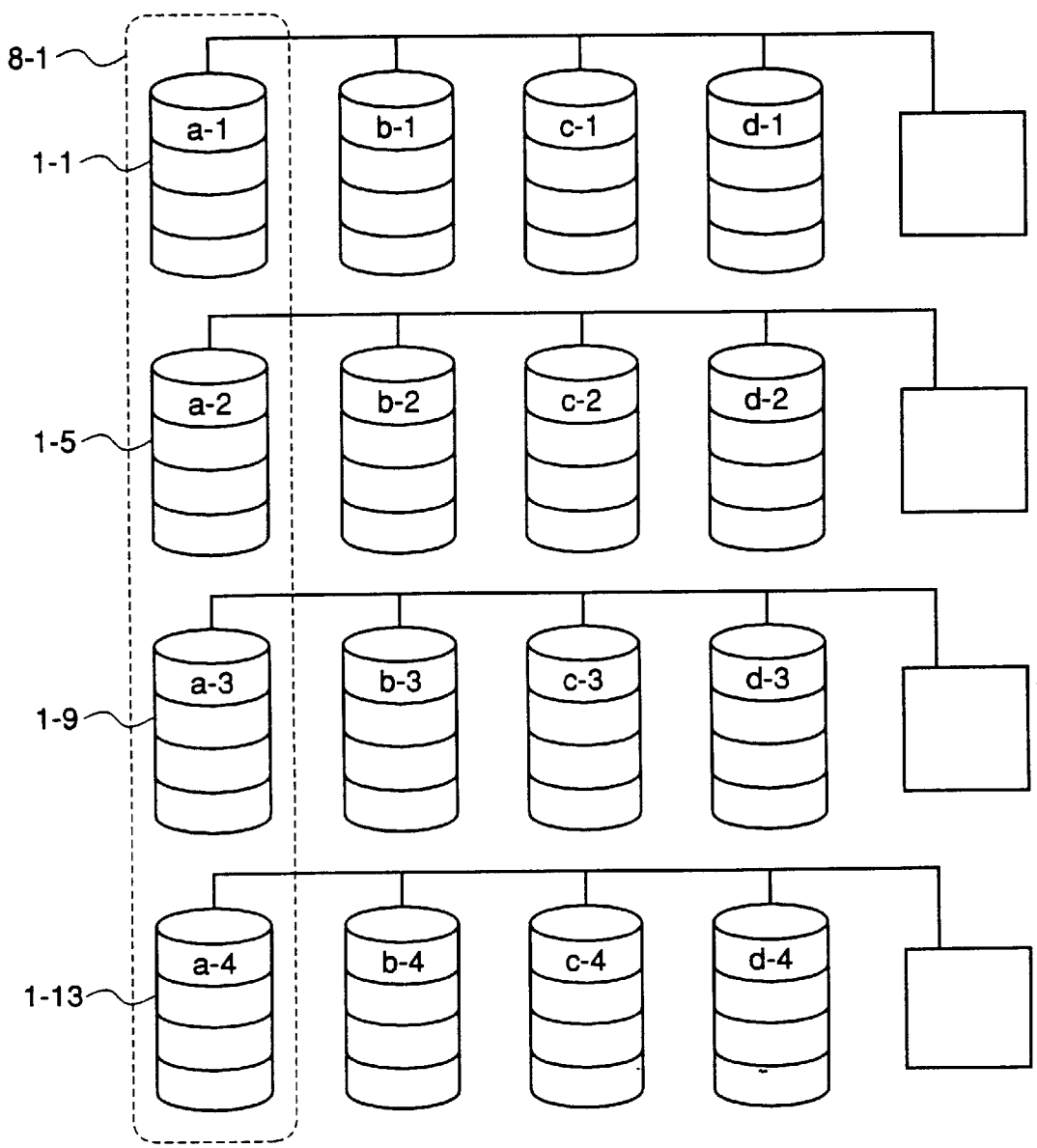
FIG. 2 is a diagram illustrating data stored in storage devices in the data transfer system according to the first embodiment of the invention.

FIG. 2 is a schematic diagram for explaining data stored in the storage devices 1-1 to 1-16 according to the first embodiment of the invention. In FIG. 2, data A (not shown) is equally divided into data a-1, a-2, a-3, and a-4, and respectively stored in the storage devices 1-1, 1-5, 1-9, and 1-13 in the virtual storage device group 8-1. Likewise, data b-1 to b-4 obtained by dividing data B, data c-1 to c-4 obtained by dividing data C, and data d-1 to d-4 obtained by dividing data D are respectively stored in the virtual storage device groups 8-2, 8-3, and 8-4.

Figure 3:
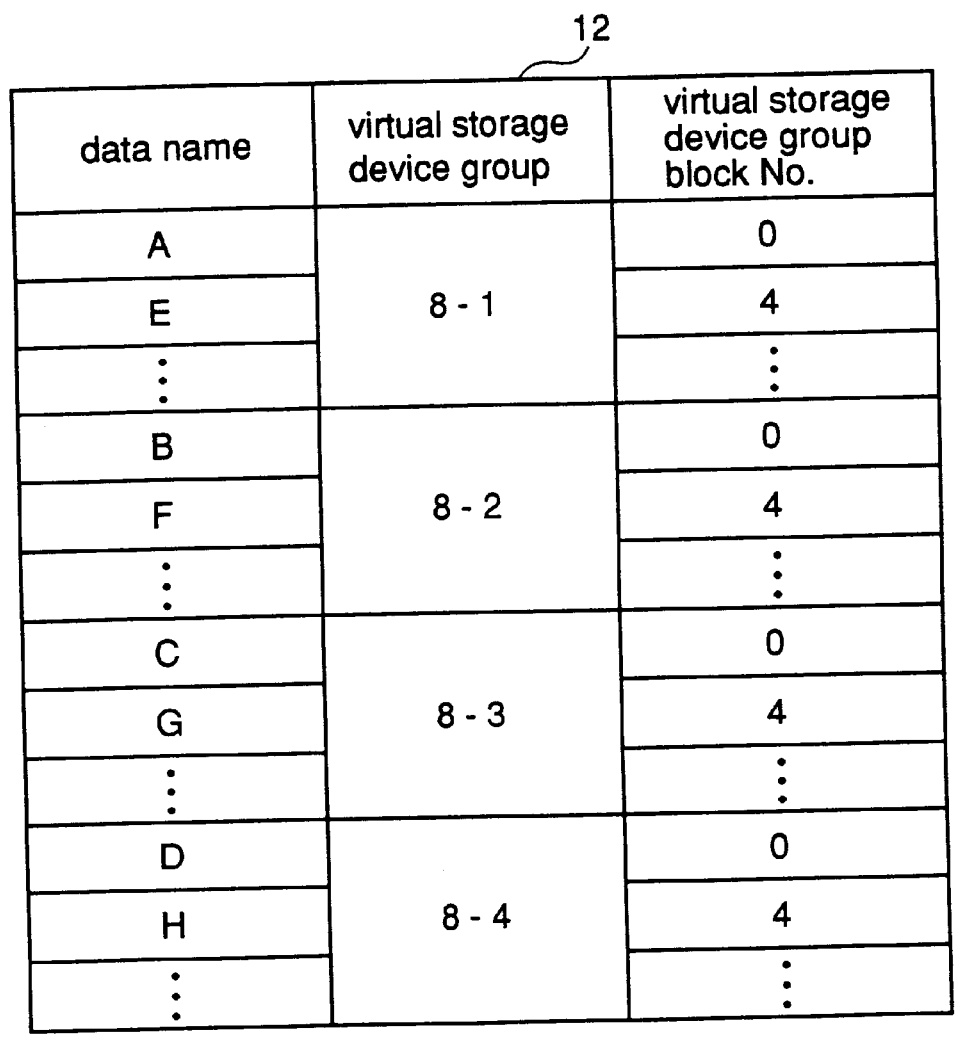
FIG. 3 shows a virtual storage device group control table according to the first embodiment of the invention.

FIG. 3 shows virtual storage device group control table 12 for the virtual storage device group control unit 9. Table 12 consists of data names, virtual storage device group numbers, and virtual storage device group block numbers. In table 12, for example, data A correspond to block number 0 in the virtual storage device group 8-1.

FIG. 4 shows virtual storage conversion table 13 for the instruction conversion unit 10. Table 13 consists of virtual storage conversion tables 13-1, 13-2, 13-3, and 13-4 for the virtual storage device groups 8-1, 8-2, 8-3, and 8-4, respectively. Table 13-1 consists of virtual storage device group block numbers, storage device group numbers, and storage device group block numbers. In table 13-1, for example, virtual storage device group block number 0 in the virtual storage device group block number 0 in the storage device group 2-1, storage device group block number 0 in the storage device group 2-2, storage device group block number 0 in the storage device group 2-3, and storage device groups block number 0 in the storage device group 2-4.

FIG. 5 shows storage device group control table 14 for the storage device group control unit 3-1 to 3-4. Table 14 consists of storage device group control tables 14-1, 14-2, 14-3, and 14-4 for the storage device groups 2-1, 2-2, 2-3, and 2-4, respectively. Table 14-1 consists of storage device group block numbers, storage device numbers, and storage device block numbers. In table 14-1, for example, storage device group block number 0 in the storage device group 2-1 corresponds to storage device block number 0 in the storage device 1-1.

A description is now given of the operation of the data transfer system shown in FIGS. 1(a) and 1(b) comprising four high-speed data transfer units, each comprising four storage devices, and n terminals, when data is stored as shown in FIG. 2 and controlled with tables 12, 13, and 14 shown in FIGS. 3, 4, and 5, respectively.

(1) The request generating unit 11 gives a request for readout of data A to the virtual storage device group control unit 9.

(2) Receiving the request for readout of data A, the virtual storage device group control unit 9 judges which virtual storage device group and which block (number) in the group store data A, with reference to virtual storage device group control table 12 shown in FIG. 3. It is judged that data A is stored in the virtual storage device group block 0 in the virtual storage device group 8-1.

(3) Next, the virtual storage device group control unit 9 gives an instruction to read out data A stored in the block 0 in the virtual storage device group 8-1 to the instruction conversion unit 10.

(4) Receiving the instruction, the instruction conversion unit 10 judges which storage device group and which block (number) in the group store the data in the virtual storage device group block 0, with reference to virtual storage conversion table 13 shown in FIG. 4. It is judged from the virtual storage conversion table 13-1 that the data in the block 0 in the virtual storage device group 8-1 correspond to data in the block 0 in the storage device group 2-1, data in the block 0 in the storage device group 2-2, data in the block 0 in the storage device group 2-3, and data in the block 0 in the storage device group 2-4.

(5) Next, the instruction conversion unit 10 gives an instruction to read out data in the block 0 in the storage device group 2-1 to the corresponding storage device group control unit 3-1. Likewise, instructions to read out data in the blocks 0 in the storage device groups 2-2, 2-3, and 2-4 are sent to the corresponding storage device group control unit 3-2, 3-3, and 3-4, respectively.

(6) Receiving the instructions, the storage device control unit 3-1 to 3-4 judge which storage device and which block (number) in the storage device store the data in each storage device group block, with reference to storage device group control tables 14-1 to 14-4 shown in FIG. 5. That is, the storage device group control unit 3-1 judges that the data in the block 0 in the storage device group 2-1 correspond to data in the block 0 in the storage device 1-1, with reference to storage device group control table 14-1. Likewise, the storage device group control unit 3-2, 3-3, and 3-4 judge that the data in the blocks 0 in the storage device groups 2-2, 2-3, and 2-4 correspond to data in the blocks 0 in the storage devices 1-5, 1-9, and 1-13, with reference to the storage device group control tables 14-2, 14-3, and 14-4, respectively.

(7) Next, the storage device group control unit 3-1 reads out data a-1 in the block 0 in the storage device 1-1 and stores the data a-1 in the buffer memory 4-1. Likewise, the storage device group control unit 3-2, 3-3, and 3-4 read out data a-2, data a-3, and data a-4 in the blocks 0 in the storage devices 15, 1-9, and 1-13, respectively, simultaneously with the data readout operation of the storage device group control unit 3-1, and these data a-2, a-3, and a-4 are stored in the buffer memories 4-2, 4-3, and 4-4, respectively.

(8) Next, the transfer control unit 5-1 transfers the data a-1 stored in the buffer memory 4-1 to the terminal 7-1 that requires the data. Likewise, the transfer control means 5-2, 5-3, and 5-4 transfer the data a-2, a-3, and a-4 stored in the buffer memories 4-2, 4-3, and 4-4, respectively, to the terminal 7-1. At this time, a header prescribed by the communication protocol is added to the data output from each transfer control unit, and the header is identified at the terminal side to reproduce the original data.

As described above, in the data transfer system according to the first embodiment of the invention, since data, which are equally divided and stored in the storage devices in the virtual storage device group, are read out, it is possible to equally divide the data readout processing from the storage device group by each storage device group control unit, the buffer memory amount used for the temporary storage of data, the data transfer processing toward the terminal by each transfer control unit, and the data transfer amount within each high-speed data transfer unit. That is, it is possible to equally distribute the processing among the high-speed data transfer units, whereby unwanted localization of the processing is avoided even when a plurality of terminals require data stored in the same storage device group.

In the first embodiment of the invention, emphasis has been placed upon a case where data are equally divided and stored in the storage devices in th virtual storage device group. However, when the high-speed data transfer units have different performances, for example, when a high-speed data transfer unit comprises, as a storage medium, HDDs while another high-speed data transfer unit comprises CD-ROMs, data are divided according to the difference in performances so that less data are transferred to the data transfer unit having a lower transfer speed while more data are transferred to the data transfer unit having a higher transfer speed. In this case, the processing can be distributed among the high-speed data transfer units according to the performances of the data transfer units.

Further, although the data transfer system according to the first embodiment of the invention includes four storage device groups, four storage devices constituting each virtual storage device group, and four high-speed data transfer units, the number of these elements is not restricted thereto.

Furthermore, although the conversion from the block numbers of the virtual storage device groups to the corresponding block numbers of the storage devices are carried out using a plurality of controls tables, this conversion may be carried out by calculation.

[Embodiment 2]

A description is now given of a data transfer system according to a second embodiment of the invention. The structure of the data transfer system according to this second embodiment is identical to the structure according to the first embodiment shown in FIGS. 1(*a*) and 1(*b*).

The data transfer system according to this second embodiment employs the data storage method according to the first embodiment and restricts the data storage size. That is, the data storage size is equivalent to the packet size of data transferred to the terminal.

Figure 6:
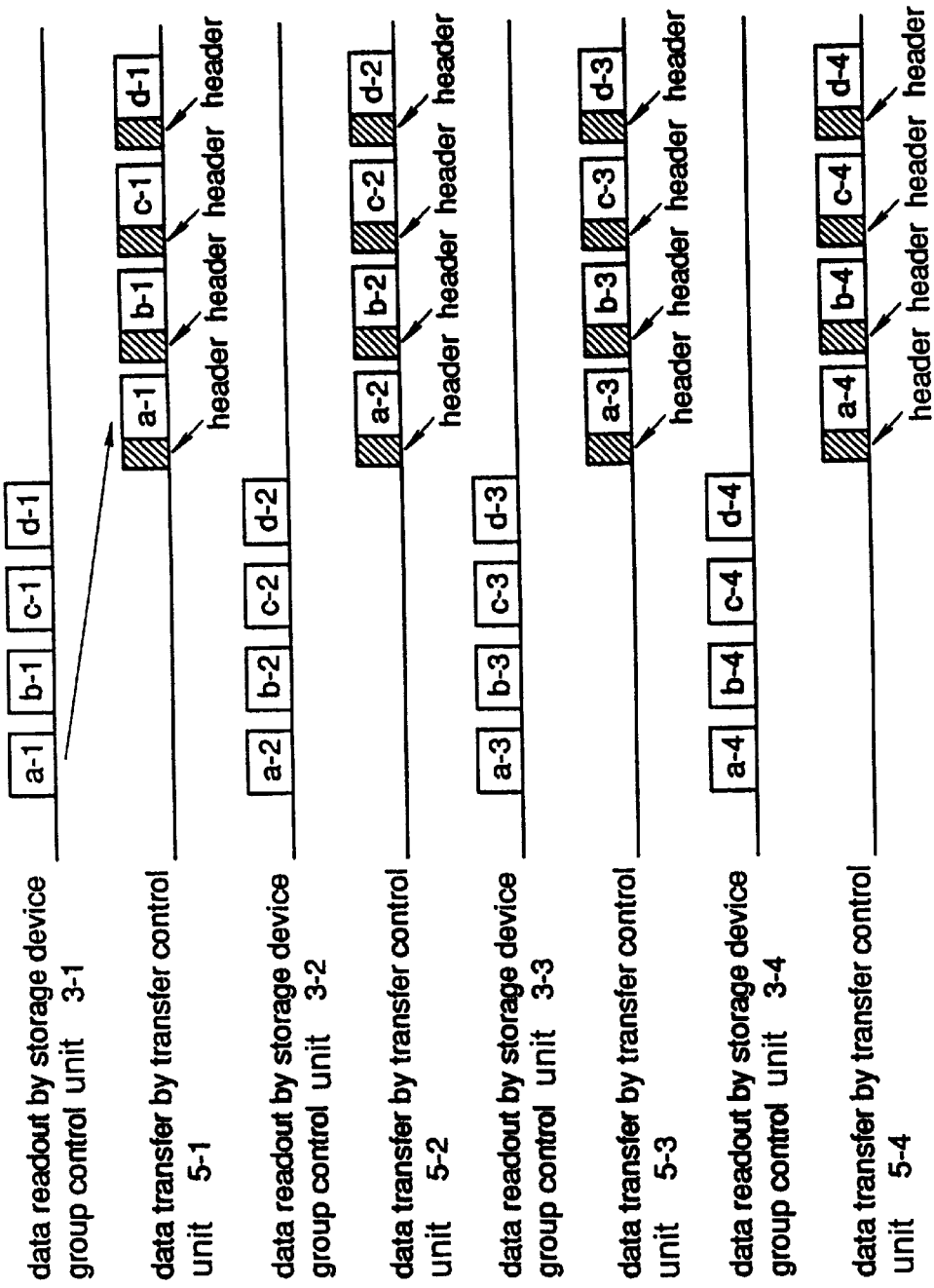
FIG. 6 is a diagram for explaining the operation of transferring data to terminals according to a second embodiment of the invention.

FIG. 6 shows the data transfer operation toward the terminal according to the second embodiment of the invention. More specifically, the data readout operations by the storage device group control unit 3-1 to 3-4 and the data transfer operations by the transfer control unit 5-1 to 5-4 are shown. In the figure, the abscissa shows time.

The operation of the data transfer system according to the second embodiment will be described using FIGS., 1(*a*), 1(*b*), and 6.

It is assumed that requests for readout of data A, B, C, and D are generated in the request generating unit 11. Receiving these requests, the virtual storage device control unit 9 gives readout instructions to the virtual storage device groups. Then, the instruction conversion unit 10 converts the readout instructions to the virtual storage device groups into readout instructions to the storage device groups and gives the instructions to the storage device control unit 3-1 to 3-4.

In advance, data A is divided into a-1, a-2, a-3, and a-4 and stored in the virtual storage device group 8-1. Likewise, data B, data C, and data D are divided and stored in the virtual storage device groups 8-2, 8-3, and 8-4, respectively. The stored data size is equivalent to the data size of the packet for transferring the data to the terminal by the transfer control unit 5-1, 5-2, 5-3, and 5-4. Therefore, as shown in FIG. 6, data a-1, b-1, c-1, and d-1 read out by the storage device control unit 3-1 are successively transferred to the buffer memory 4-1, and further, the transfer control unit 5-1 adds the header of the packet to the data a-1, b-1, c-1, and d-1 in the buffer memory 4-1 and transfers these data to the terminal. The operations of the storage device control unit 3-2 to 3-4 and the transfer control unit 5-2 to 5-4 are similar to the above-mentioned operation.

As described above, in the data transfer system according to the second embodiment of the invention, data are divided and stored in the storage devices in the virtual storage device group so that the data in each storage device have the same size as the packet size for transferring the data to the terminal, and the data is sent to the terminal. Therefore, the data transfer processing to the terminal can be equally distributed among a plurality of high-speed data transfer units. Further, when data is transferred from the storage device to the terminal, since the data size read out from the storage device is equivalent to the data size of the packet in the network, the data processing can be facilitated when the packet is produced.

Although the data transfer system according to this second embodiment includes four storage device groups, four storage devices constituting each virtual storage device group, and four high-speed data transfer units, the number of these elements is not restricted thereto.

[Embodiment 3]

Figure 7:
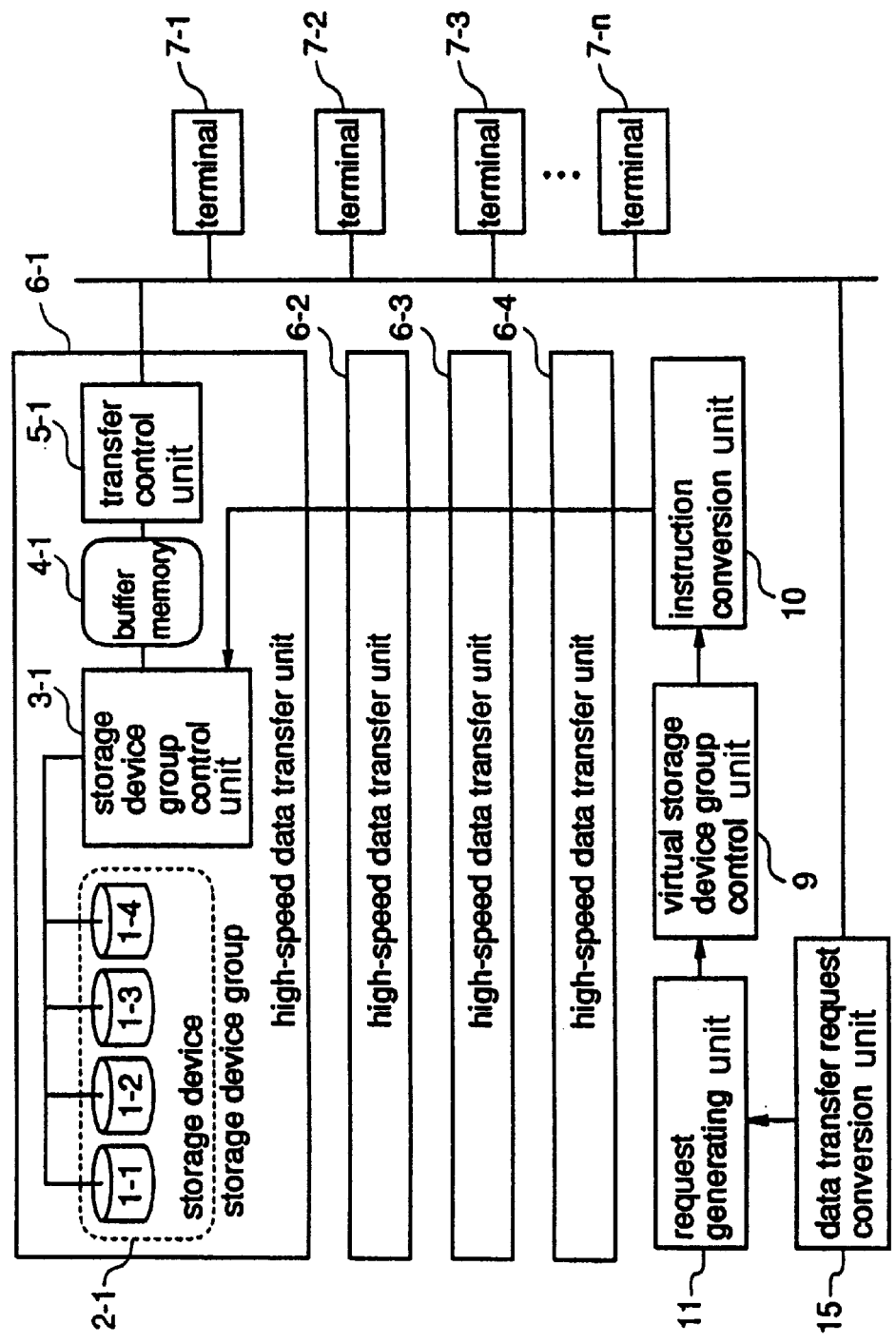
FIG. 7 is a block diagram illustrating a data transfer system according to a third embodiment of the present invention.

FIG. 7 is a block diagram illustrating a data transfer system according to a third embodiment of the invention. The data transfer system according to this third embodiment is identical to the data transfer system shown in FIGS. 1(a) and 1(b) according to the first embodiment except that a data transfer request conversion unit 15 is added. The data transfer system according to this third embodiment employs the data storage method according to the first embodiment and restricts the data storage size to a size obtained by dividing the request size from the terminal by the number of the high-speed data transfer units.

Figure 8:
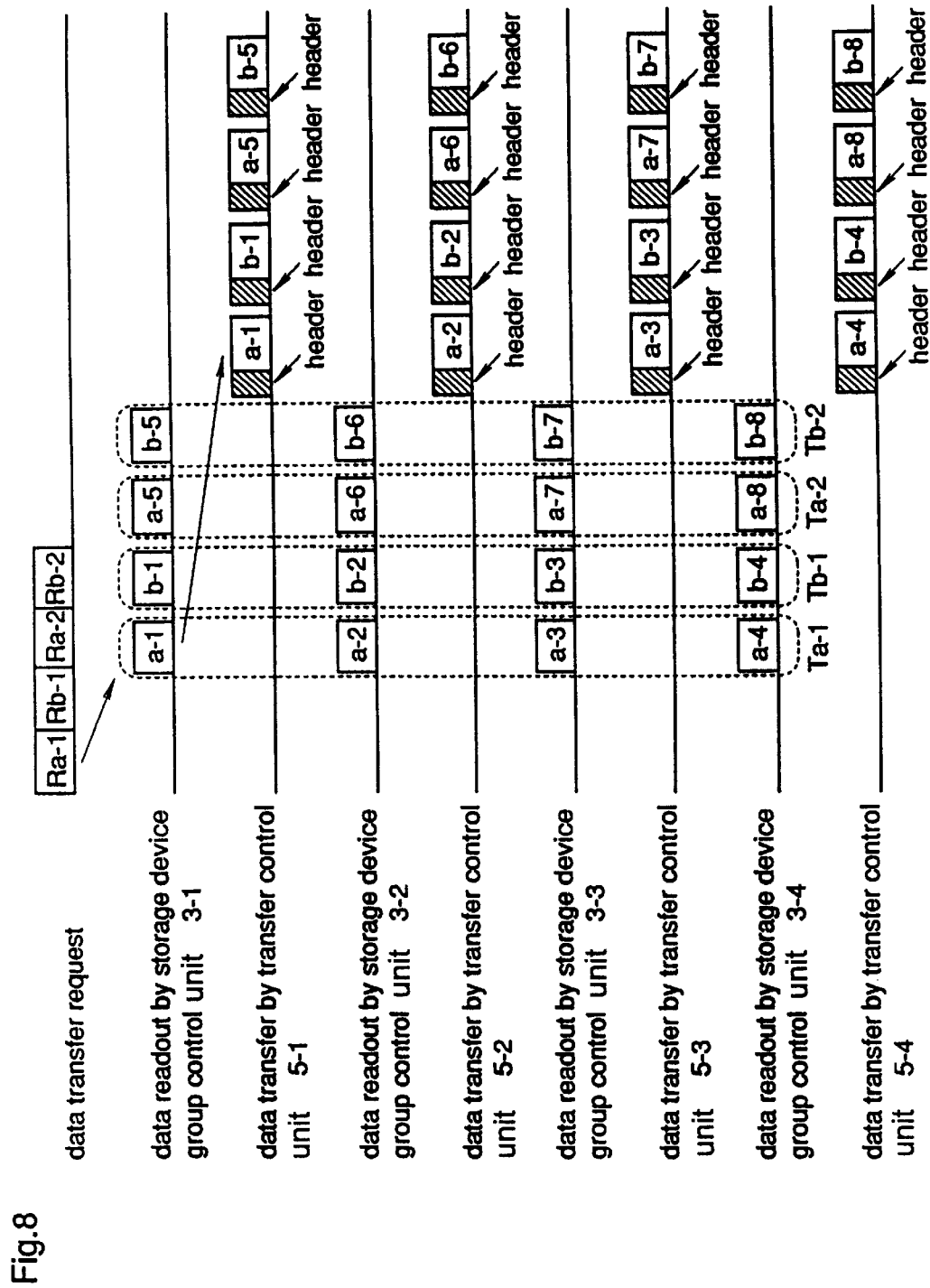
FIG. 8 is a diagram for explaining the operation of transferring data to terminals according to the third embodiment of the invention.

FIG. 8 is a diagram for explaining the operation of transferring data to the terminal according to the third embodiment of the invention. More specifically, FIG. 8 shows the data readout operations by the storage device group control unit 3-1 to 3-4 and the data transfer operations by the transfer control unit 5-1 to 5-4. In the figure, the abscissa shows time.

A description is given of the operation of the data transfer system using FIGS. 7 and 8.

It is assumed that requests for transfer of data A, Ra-1 and Ra-2, and requests for transfer of data B, Rb-1 and Rb-2, are output from the terminal to the data transfer request conversion unit 15. The data transfer request conversion unit 15 converts the data transfer requests Ra-1, Ra-2, Rb-1, and Rb-2 into data readout request each having a data size obtained by dividing each of the data transfer requests by four, that is, the number of the high-speed data transfer units. Thereafter, the data readout requests are transferred to the request generating unit 11. Receiving the data readout requests, the request generating unit 11 generates readout requests and gives the requests to the virtual storage device group control unit 9. Then, the virtual storage device group control unit 9 gives readout instructions to the virtual storage device groups, and the instruction conversion unit 10 converts the readout instructions to the virtual storage device groups into readout instructions to the storage device groups and gives the readout instructions to the storage device group control means 3-1, 3-2, 3-3, and 3-4.

In advance, data A are divided into a-1, a-2, a-3, and a-4 and successively stored in the virtual storage device group. The data size stored in the storage device is equivalent to a data size obtained by dividing the size the data transfer request Ra-1 by four, that is, the number of the high-speed data transfer units.

Therefore, as illustrated in FIG. 8, data Ta-1 to be read out for the data transfer request Ra-1 from the terminal are read out, as a-1, a-2, a-3, and a-4, from the storage devices included in all the high-speed data transfer units. Likewise, for the data transfer requests Ra-2, Rb-1, and Rb-2, data Ta-1, Th-1, and Tb-2 are read out from the storage devices included in all the high-speed data transfer units. Accordingly, for a request, data is transferred from all the high-speed data transfer units to the terminal.

As described above, in the data transfer system according to the third embodiment of the invention, the data size to be transferred in response to a single data transfer request between the storage devices in the virtual storage device group is divided by the number of the high-speed data transfer units, and data is, in advance, divided with the size and stored in the respective storage devices in the virtual storage device group, followed by transfer of the data to the terminal. So, the data transfer processing to the terminal can be equally distributed among a plurality of high-speed data transfer units. Further, when data is transferred from the storage devices to the terminal in response to the data transfer request from the terminal, data is transferred from all the high-speed data transfer units. That is, even when the terminal outputs a plurality of data transfer requests, the data transfer requests are not localized in a single high-speed data transfer unit, and the data read out from the storage devices are equally output from all the high-speed data transfer units.

Although the data transfer system according to this third embodiment includes four storage device groups, four storage devices constituting each virtual storage device group, four high-speed data transfer units, and four terminals, the number of these elements is not restricted thereto.

[Embodiment 4]

Figure 9:
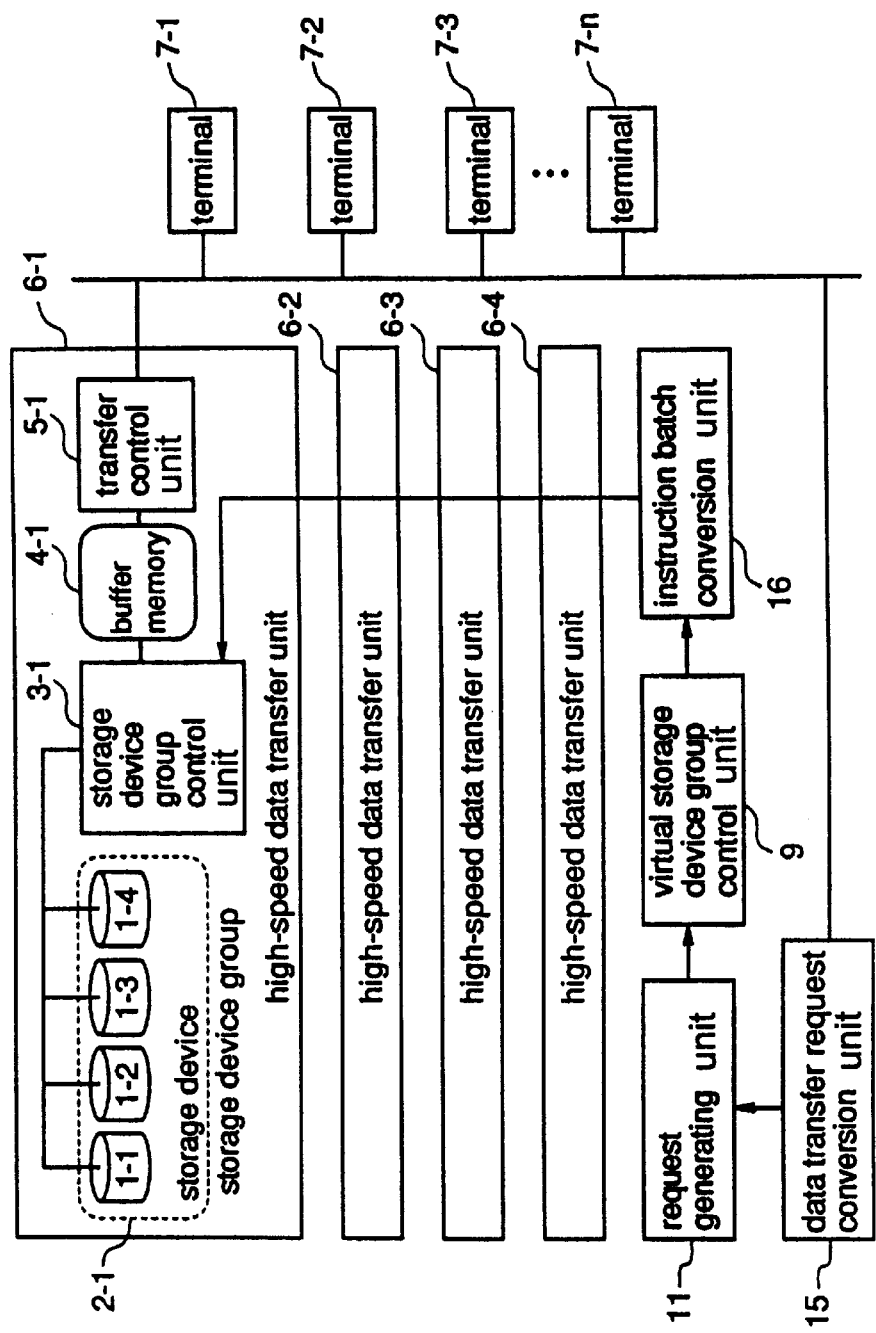
FIG. 9 is a block diagram illustrating a data transfer system according to a fourth embodiment of the present invention.

FIG. 9 is a block diagram illustrating a data transfer system in accordance with a fourth embodiment of the present invention. The structure of the data transfer system according to this fourth embodiment is identical to the structure according to the third embodiment except that an instruction batch conversion unit 16 including an instruction batch converter (not shown) for converting a data readout instruction to an instruction pre-read data is provided in place of the instruction conversion unit 10 according to the third embodiment.

Figure 10:
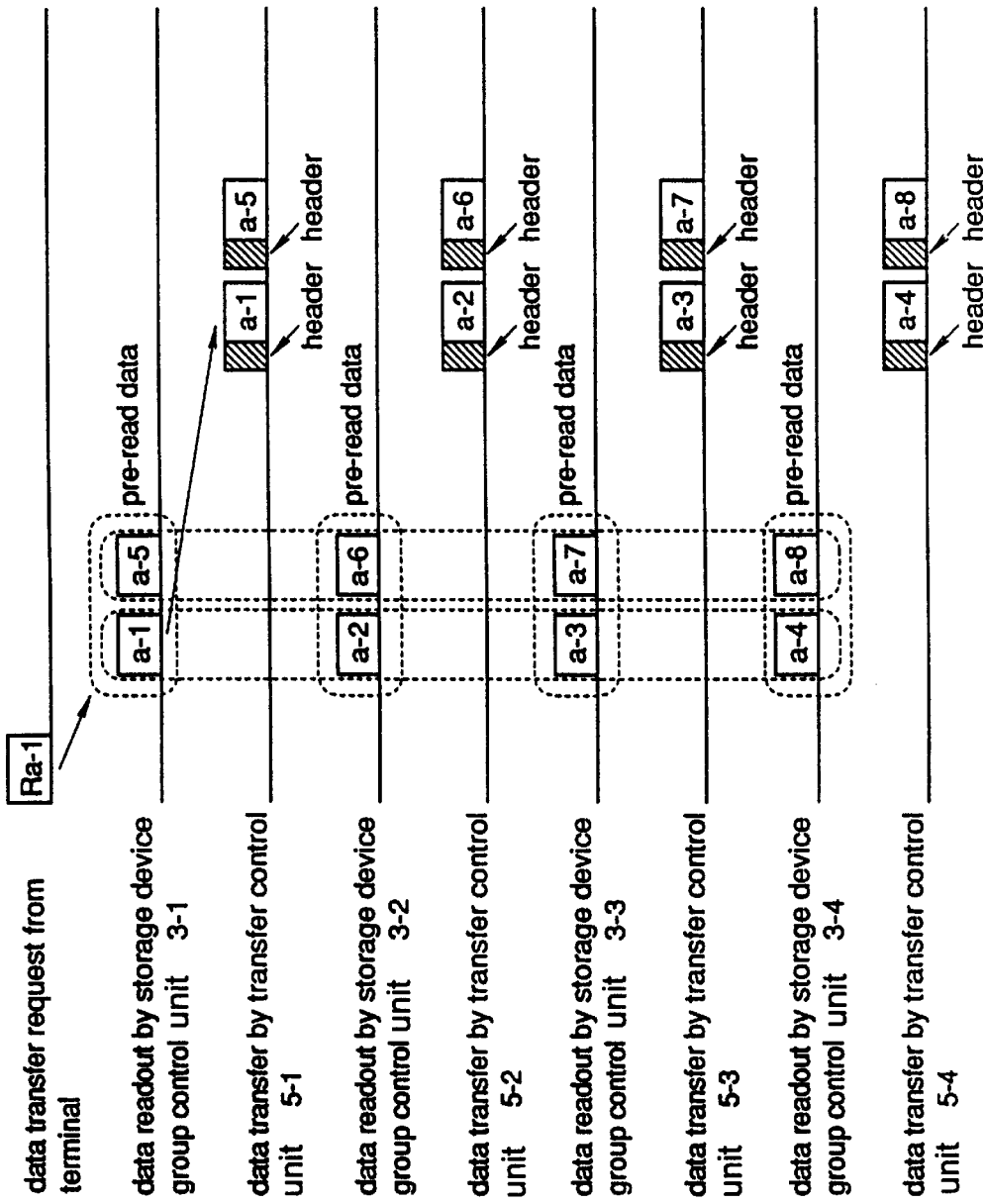
FIG. 10 is a diagram for explaining the operation of transferring data to terminals according to the fourth embodiment of the present invention.

FIG. 10 is a diagram for explaining the operation of transferring data to terminals according to the fourth embodiment of the invention. More specifically, data readout operations by the storage device group control unit 3-1 to 3-4 and data transfer operations by the transfer control unit 5-1 to 5-4 are shown. In the figure, the abscissa shows time.

The operation of the data transfer system according to this fourth embodiment of the invention will be described using FIGS. 9 and 10.

It is now assumed that a data transfer request Ra-1 is output from a terminal. The data transfer request conversion unit 15 converts the data transfer request Ra-1 into data readout requests, each having a data size obtained by dividing the data transfer request Ra-1 by four, that is, the number of the high-speed data transfer units, and gives the data readout requests to the request generating unit 11. Then, the request generating unit 11 gives the data readout requests to the virtual storage device group control unit 9, and the virtual storage device group control unit 9 gives data readout instructions for the virtual storage device groups to the instruction batch conversion unit 16.

When a readout request for data a-1 is given to the storage device group control unit 3-1, the instruction batch conversion unit 16 outputs a readout request for data a-5 simultaneously with the readout request for data a-1, i.e., a pre-read is performed. The pre-read of data is controlled by the instruction batch conversion unit 16 as pre-read data information. When the instruction batch conversion unit 16 judges that the pre-read data is requested by the terminal, the pre-read data is output from the transfer control unit 5-1. On the other hand, when the instruction batch conversion unit 16 judges that the pre-read data are not requested by the terminal, no data is output from the transfer control unit 5-1. Further, when a similar data readout request is given to any of the storage device group control unit 3-2, 3-3, and 3-4, data of a prescribed size including the requested data are pre-read.

As described above, in the data transfer system according to the fourth embodiment of the invention, when the instruction batch conversion unit 16 receives data readout requests, data divided and stored in the storage device groups of the respective high-speed data transfer units are pre-read, whereby the stored data are successively transferred at a high speed. Further, data is equally output from all the high-speed data transfer units.

Although in this fourth embodiment the instruction batch conversion unit 16 is employed in place of the instruction conversion unit 10 according to the third embodiment, the instruction batch conversion unit 16 may be applied to the data transfer system according to the second embodiment of the invention with the same effects as described above.

Furthermore, although the data transfer system according to this fourth embodiment includes four storage device groups, four storage devices constituting each virtual storage device group, four high-speed data transfer units, and four terminals, the number of these elements is not restricted thereto.

Furthermore, although the amount of the pre-read data is equal to one data size in the fourth embodiment of the invention, it may be two data size or more as long as the performance of the high-speed data transfer unit permits.

[Embodiment 5]

Figure 11:
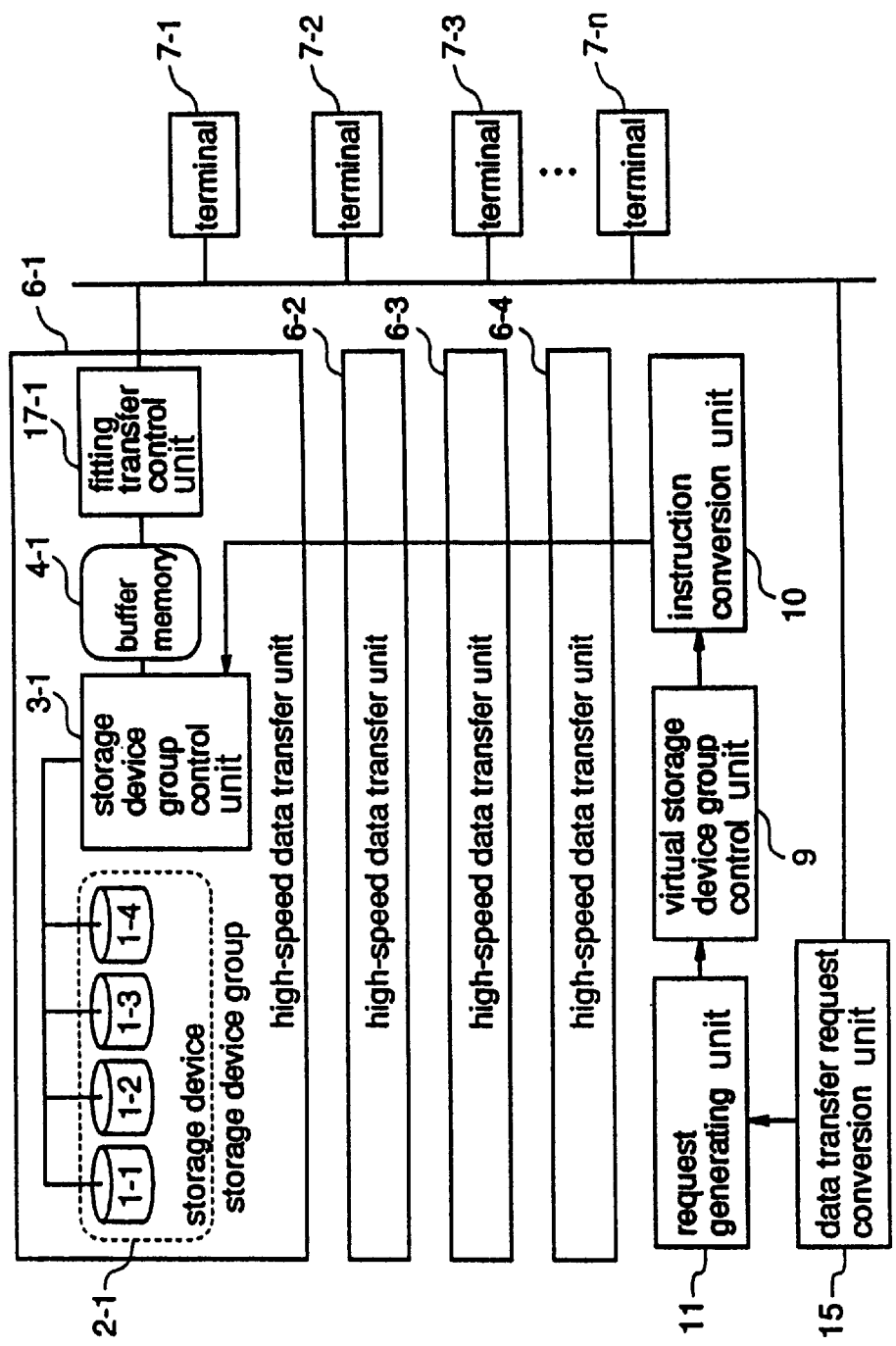
FIG. 11 is a block diagram illustrating a data transfer system according to a fifth embodiment of the invention.

FIG. 11 is a block diagram illustrating a data transfer system in accordance with a fifth embodiment of the present invention. The data transfer system according to this fifth embodiment is different from the data transfer systems according to the second and third embodiments only in that unit for controlling transfer of fitting (hereinafter referred to as fitting transfer control unit) 17-1 to 17-4 are provided in place of the transfer control unit 5-1 to 5-4.

The operation of the fitting transfer control unit will be described referring to FIG. 12.

Figure 12:
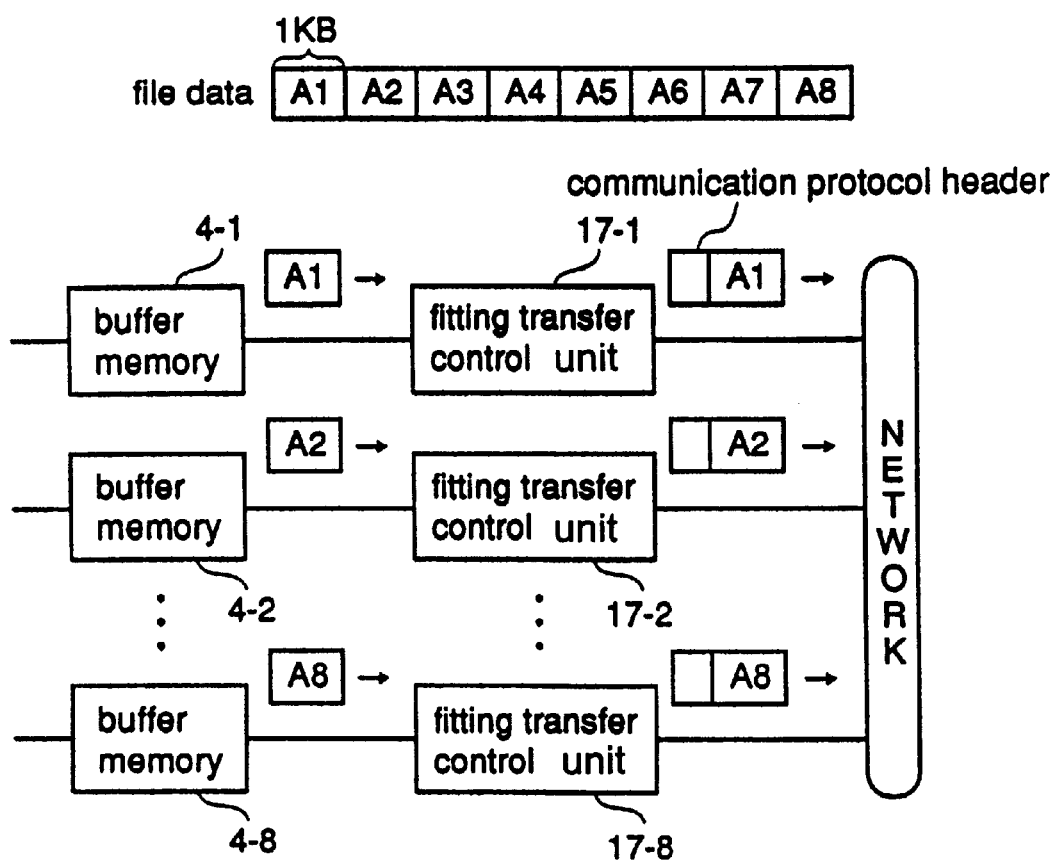
FIG. 12 is a diagram for explaining the data transfer processing according to the fifth embodiment of the invention.

In FIG. 12, fitting transfer control unit 17-1 to 17-8 transfer file data of 8 K bytes, each 1 K bytes, according to Network File System (NFS) of TCP/IP. Although the data transfer system shown in FIG. 11 includes only four fitting transfer control unit, the operation will be described with respect to eight fitting transfer control unit to facilitate the description.

(1) The fitting transfer control unit 17-1 to 17-8 receive 1 K byte data transfer requests from the data transfer request conversion unit 15.

(2) On the basis of the data transfer requests, the fitting transfer control units 17-1 to 17-8 take out corresponding 1 K byte file data from the buffer memories 4-1 to 4-8, respectively.

Figure 13:
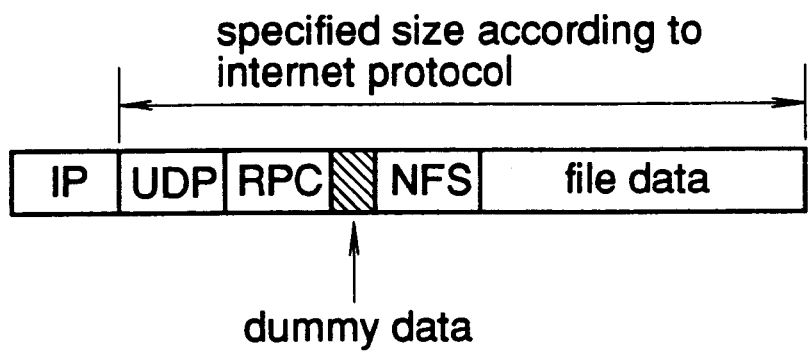
FIG. 13 is a diagram illustrating a packet structure of head data according to the fifth embodiment of the invention.

(3) When the file data to be transferred are a header of the divided file data, the fitting transfer control unit adds UDP (User Datagram Protocol), RPC (Remote Procedure Calls), and NFS protocol headers between and IP (Internet Protocol) header serving as a communication protocol A and the file data, as shown in FIG. 13. At this time, 0 data of 4 bytes are added to the RPC protocol header serving as a communication protocol header B so that the data size from the UDP header to the end of the file data becomes a data size equal to a multiple of 8, specified by the IP. Thereafter, the transfer data so produced are transferred to the network.

Figure 14:
FIG. 14 is a diagram illustrating a packet structure of data other than the head data according to the fifth embodiment of the invention.

(4) In step (3), if the file data to be transferred is not a header of the divided file data, an IP header is added at the beginning of the file data as shown in FIG. 14, and the transfer data so produced is transferred to the network.

As described above, in the data transfer system according to this fifth embodiment of the invention, since the size of file data is adjusted to a data size according to the IP by adding dummy data to the RPC protocol header, file data of a requested size can be transferred.

While in this fifth embodiment of the invention the fitting transfer control unit adds 4 bytes of 0 data to the RPC protocol header, it may add plural bytes of an arbitrary value (0–9) as long as the byte number is based on the IP regulation.

Further, although the NFS of TCP/IP is employed as a network protocol, other network protocols may be employed.

Furthermore, although dummy data is added to one protocol header, dummy data may be added to a plurality of protocol headers.

[Embodiment 6]

Figure 15:
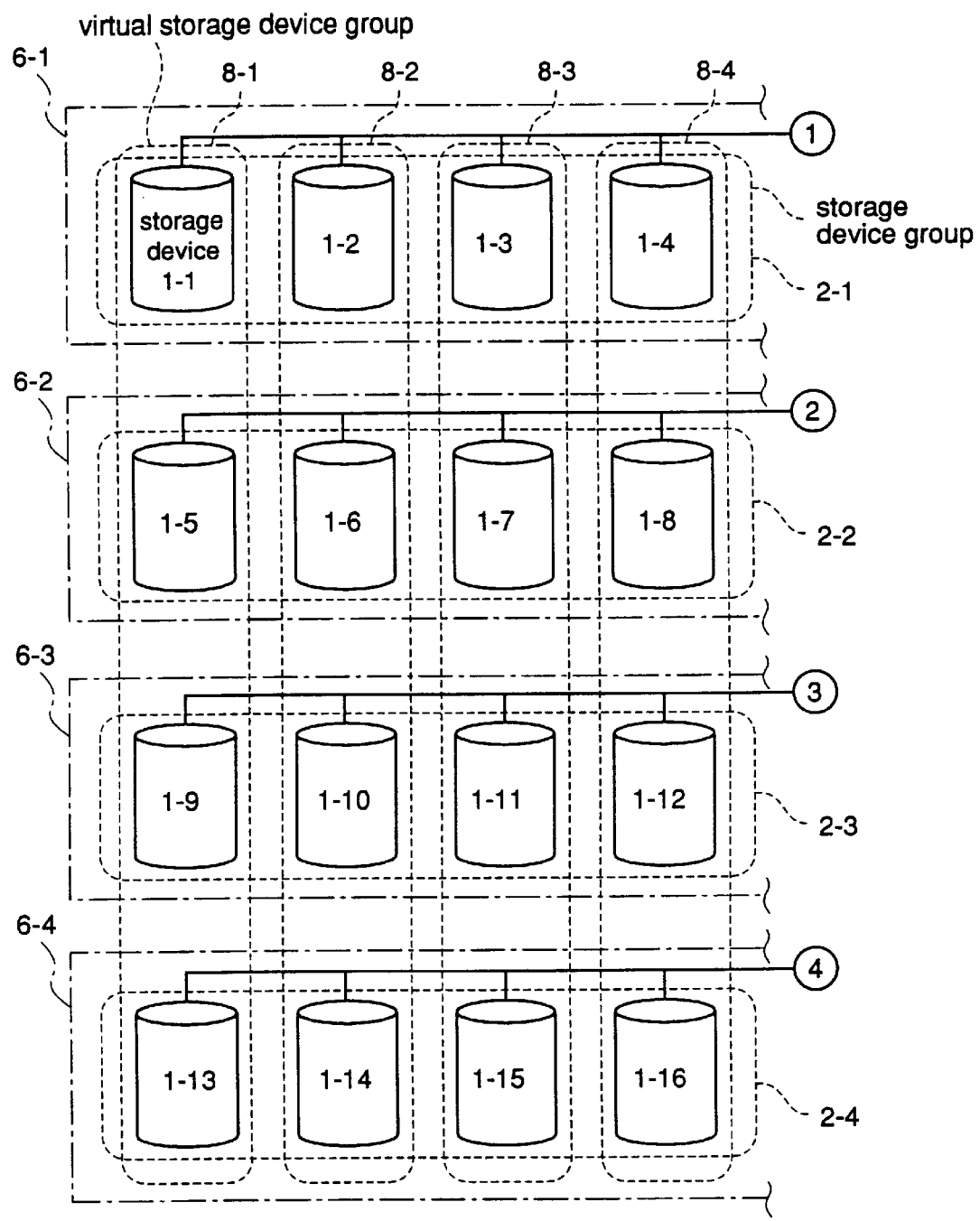
FIGS. 15(a) and 15(b) are block diagrams illustrating a data transfer system according to a sixth embodiment of the invention.
Figure 15:
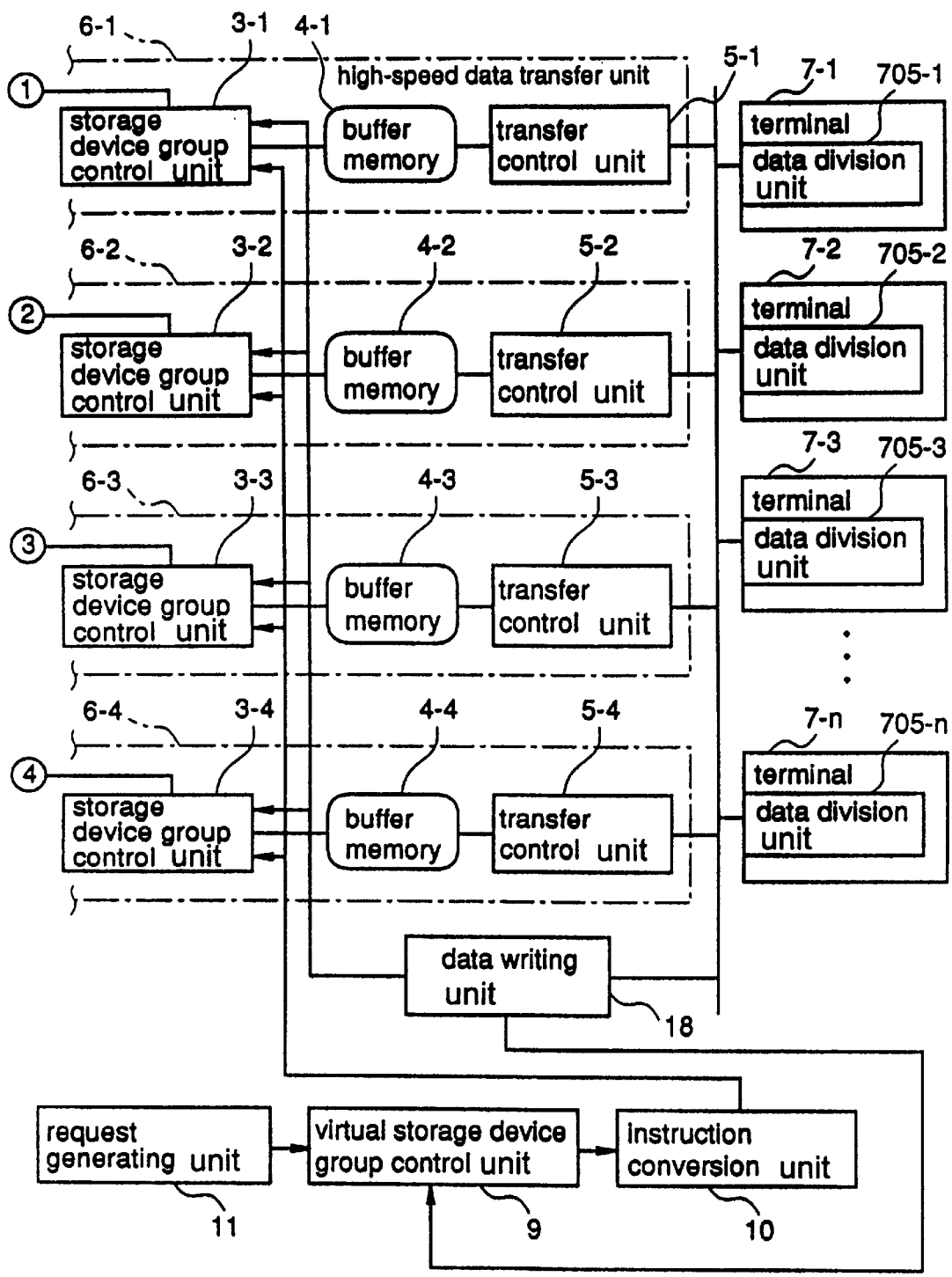

FIGS. 15(*a*) and 15(*b*) are block diagrams illustrating a data transfer system according to a sixth embodiment of the present invention. The structure of the data transfer system according to this sixth embodiment is different from the structure according to the first embodiment only in that data division unit 705-1 to 705-n for dividing data to be written in the storage devices 1-1 to 1-16 from the terminals 7-1 to 7-n into blocks, each having the size of transfer packet to the terminals 7-1 to 7-n, are included in the terminals, and a data writing unit 18 for informing positional information of the written data of the virtual storage device group control unit 9 is added.

In order to transfer data from the transfer control unit 5-1 to 5-4 by a packet of 1 K bytes, the terminal 7-1 writes file data of 16 K bytes into the storage devices according to the following process steps.

(1) Initially, the data division unit 705-1 divides the 16 K bytes file data into data a-1 to a-16.

(2) The data division unit 705-1 gives a data writing request to the data writing unit 18, and transfers data a-1, a-5, a-9, and a-13 through the transfer control unit 5-1 to the buffer memory 4-1. Likewise, data a-2, a-6, a-10, and a-14 is transferred through the transfer control unit 5-2 to the buffer memory 4-2, data a-3, a-7, a-11, and a-15 are transferred through the transfer control unit 5-3 to the buffer memory 4-3, and data a-4, a-8, a-12, and a-16 are transferred through the transfer control unit 5-3 to the buffer memory 4-3.

(3) Receiving the data writing request, the data writing unit 18 gives a data writing instruction to the storage device group control unit 3-1 so that data a-1 are stored in the storage device 1-1. Likewise, data writing instructions are output so that data a-5 is stored in the storage device 1-2, data a-9 is stored in the storage device 1-3, and data a-13 is stored in the storage device 1-4.

(4) As in step (3), the data writing unit 18 gives data writing instructions to the storage device group control unit 3-2 so that data a-2 is stored in the storage device 1-5, data a-6 is stored in the storage device 1-6, data a-10 is stored in the storage device 1-7, and data a-14 are stored in the storage device 1-8.

(5) As in step (3), the data writing unit 18 gives data writing instructions to the storage device group control unit 3-3 so that data a-3 is stored in the storage device 1-9, data a-7 is stored in the storage device 1-10, data a-11 is stored in the storage device 1-11, and data a-15 is stored in the storage device 1-12.

(6) As in step (3), the data writing unit 18 gives data writing instructions to the storage device group control unit 3-4 so that data a-4 is stored in the storage device 1-13, data a-8 is stored in the storage device 1-14, data a-12 is stored in the storage device 1-15, and data a-16 is stored in the storage device 1-16.

(7) The data writing unit 18 informs the storage positions of data a-1 to a-16 to the virtual storage device group control unit 9, and the virtual storage device group control unit 9 adds the positional information of the stored data to virtual storage device group control table 12.

In the data transfer system according to the sixth embodiment of the invention, data is equally stored in the storage devices 1-1 to 1-16 at a high speed, without putting a load on the virtual storage device group control unit 9.

While in this sixth embodiment data is divided into blocks each having the size of a transfer packet, data may be divided into blocks each having a size obtained by dividing the size of the data readout request from the terminal by the number of the high-speed data transfer units.

[Embodiment 7]

Figure 16:
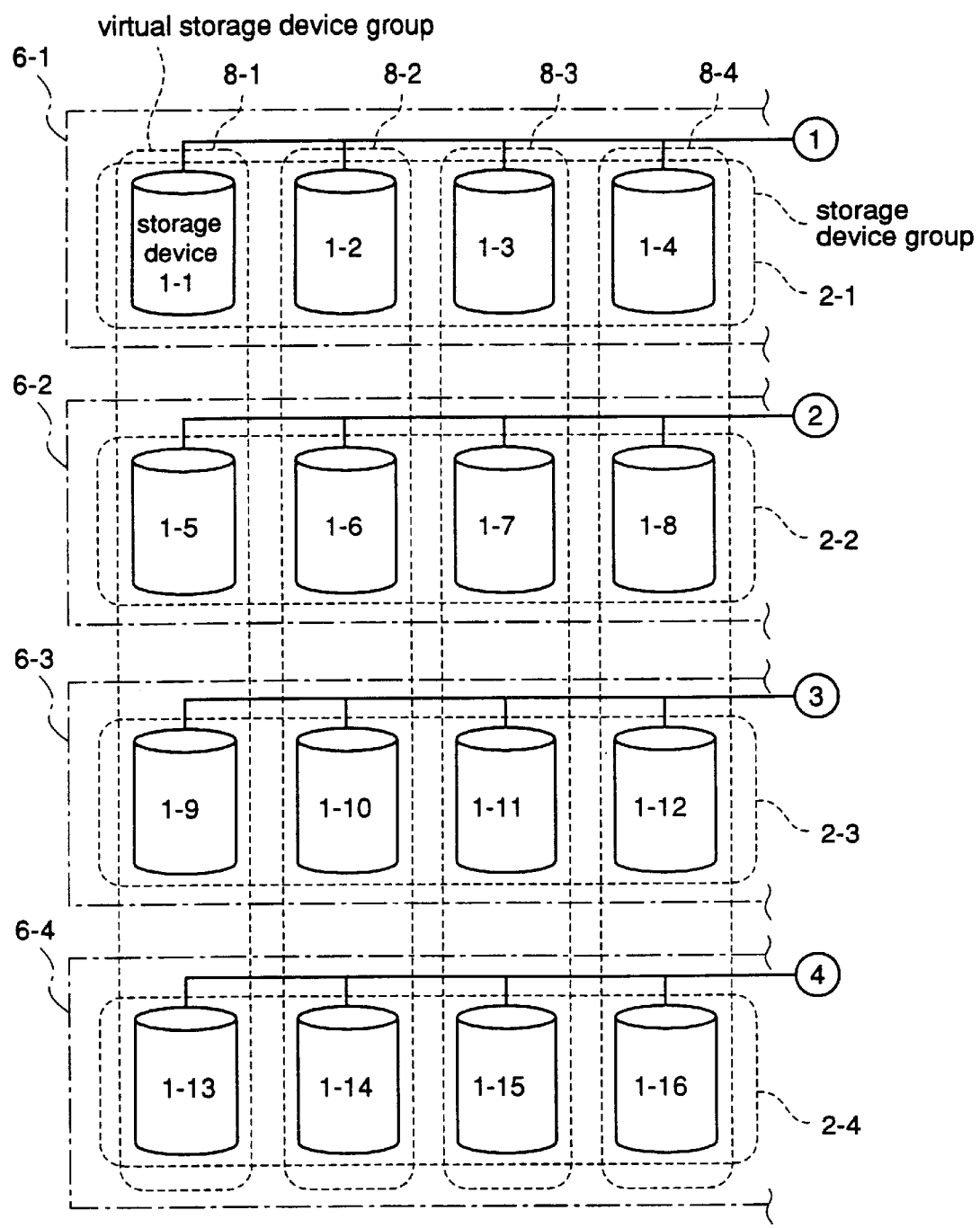
FIGS. 16(a) and 16(b) are block diagrams illustrating a data transfer system according to a seventh embodiment of the invention.
Figure 16:
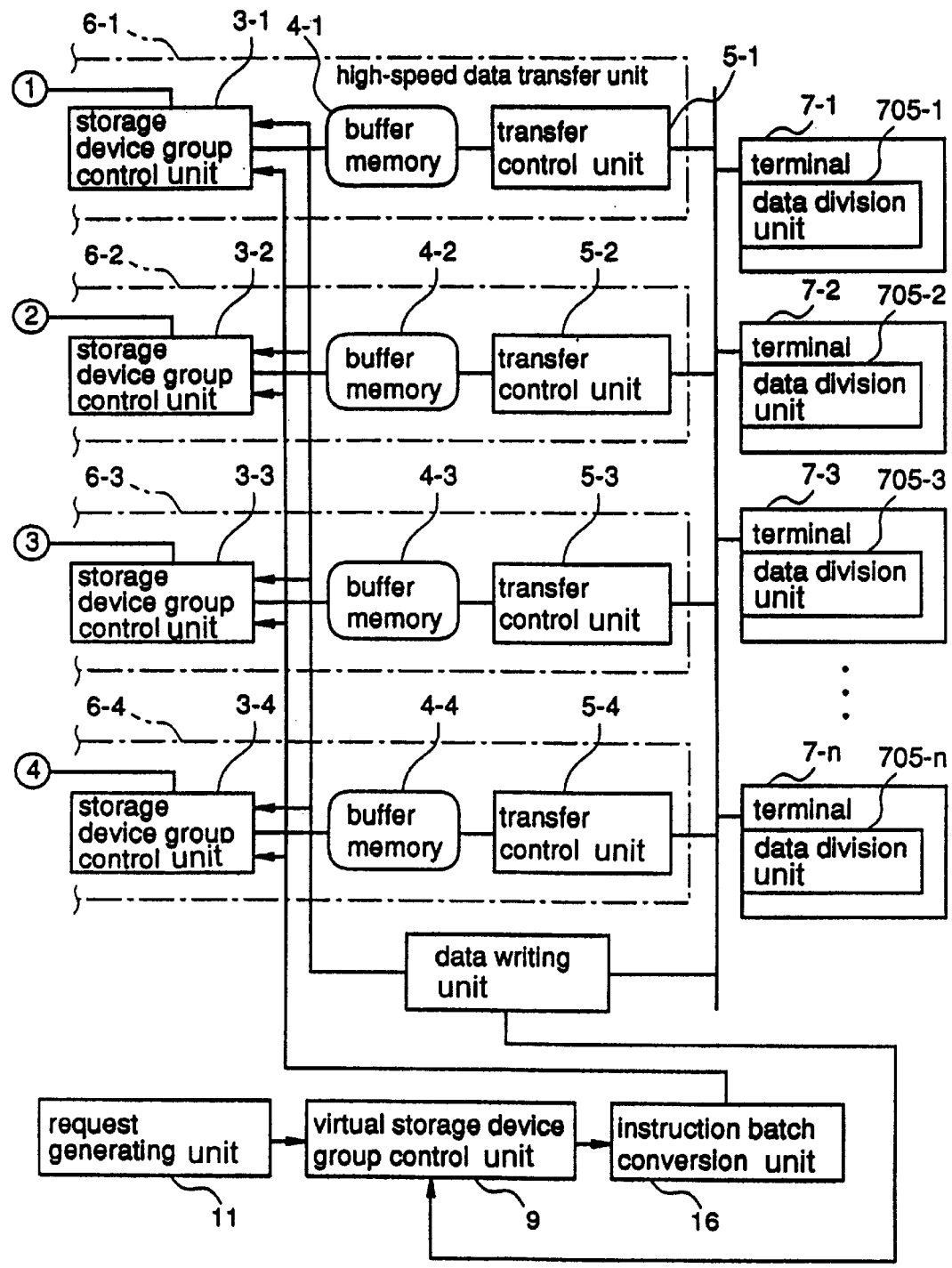

FIGS. 16(*a*) and 16(*b*) are block diagrams illustrating a data transfer system in accordance with a seventh embodiment of the invention. The data transfer system according to this seventh embodiment is different from the data transfer system according to the sixth embodiment only in that an instruction batch conversion unit 16 is used in place of the instruction conversion unit 10.

In order that data are read out from the storage devices and sent to the buffer memories, by 4 K bytes, by the instruction batch conversion unit 16 and the data are transferred from the transfer control unit 5-1 to 5-4 by a packet of 1 K bytes, the terminal 7-1 writes file data of 64 K bytes into the storage devices according to the followings process steps.

(1) Initially, the data division unit 705-1 divides the 64 K byte file data into 16×4, i.e., a-1 to a-64, each having 1 K bytes.

(2) The data division unit 705-1 gives a data writing request to the data writing unit 18, and transfers data a-1, a-5, a-9, and a-13 through the transfer control unit 5-1 to the buffer memory 4-1. Likewise, data a-2, a-6, a-10, and a-14 are transferred through the transfer control unit 5-2 to the buffer memory 4-2, data a-3, a-7, a-11, and a-15 are transferred through the transfer control unit 5-3 to the buffer memory 4-3, and data a-4, a-8, a-12, and a-16 are transferred through the transfer control unit 5-4 to the buffer memory 4-4.

(3) Receiving the data writing request, the data writing unit 18 gives a data writing instruction to the storage device group control unit 3-1 so that data a-1, a-5, a-9, and a-13 are stored, as serial data, in the storage device 1-1. Likewise, a data writing instruction is given to the storage device group control unit 3-2 so that data a-2, a-6, a-10, and a-14 are stored in storage device 1-5, a data writing instruction is given to the storage device group control unit 3-3 so that data a-3, a-7, a-11, and a-15 are stored in the storage device 1-9, and a data writing instruction is given to the storage device group control unit 3-4 so that data a-4, a-8, a-12, and a-16 are stored in the storage device 1-13.

(4) As in step (2), the data division unit 705-1 transfers data a-17, a-21, a-25, and a-29 through the transfer control unit 5-1 to the buffer memory 4-1. Likewise, data a-18, a-22, a-26, and a-30 are transferred through the transfer control unit 5-2 to the buffer memory 4-2, data a-19, a-23, a-27, and a-31 are transferred through the transfer control unit 5-3 to the buffer memory 4-3, and data a-20, a-24, a-28, and a-32 are transferred through the transfer control unit 5-4 to the buffer memory 4-4.

(5) As in step (3), the data writing unit 18 gives a data writing instruction to the storage device group control unit 3-1 so that data a-17, a-21, a-25, and a-29 are stored, as serial data, in the storage device 1-1. Likewise, a data writing instruction is given to the storage device group control unit 3-2 so that data a-18, a-22, a-26, and a-30 are stored in the storage device 1-6, a data writing instruction is given to the storage device group control unit 3-3 so that data a-19, a-23, a-27, and a-31 are stored in the storage device 1-10, and a data writing instruction is given to the storage device group control unit 3-4 so that data a-20, a-24, a-28, and a-32 are stored in the storage device 1-14.

(6) As in step (2), the data division unit 705-1 transfers data a-33, a-37, a-41, and a-45 through the transfer control unit 5-1 to the buffer memory 4-1. Likewise, data a-34, a-38, a-42, and a-46 are transferred through the transfer control unit 5-2 to the buffer memory 4-2, data a-35, a-39, a-43, and a-47 are transferred through the transfer control unit 5-3 to the buffer memory 4-3, and data a-36, a-40, a-44, and a-48 are transferred through the transfer control unit 5-4 to the buffer memory 4-4.

(7) As in step (3), the data writing unit 18 gives a data writing instruction to the storage device group control unit 3-1 so that data a-33, a-37, a-41, and a-45 are stored, as serial data, in the storage device 1-3. Likewise, a data writing instruction is given to the storage device group control unit 3-2 so that data a-34, a-38, a-42, and a-46 are stored in the storage device 1-7, a data writing instruction is given to the storage device group control unit 3-3 so that data a-35, a-39, a-43, and a-47 are stored in the storage device 1-11, and a data writing instruction is given to the storage device group control unit 3-4 so that data a-36, a-40, a-44, and a-48 are stored in the storage device 1-15.

(8) As in step (2), the data division unit 705-1 transfers data a-49, a-53, a-57, and a-61 through the transfer control unit 5-1 to the buffer memory 4-1. Likewise, data a-50, a-54, a-58, and a-62 are transferred through the transfer control unit 5-2 to the buffer memory 4-2, data a-51, a-55, a-59, and a-63 are transferred through the transfer control unit 5-3 to the buffer memory 4-3, and data a-52, a-56, a-60, and a-64 are transferred through the transfer control unit 5-4 to the buffer memory 4-4.

(9) As in step (3), the data writing unit 18 gives a data writing instruction to the storage device group control unit 3-1 so that data a-49, a-53, a-57, and a-61 are stored, as serial data, in the storage device 1-4. Likewise, a data writing instruction is given to the storage device group control unit 3-2 so that data a-50, a-54, a-58, and a-62 are stored in the storage device 1-8, a data writing instruction is given to the storage device group control unit 3-3 so that data a-51, a-55, a-59, and a-63 are stored in the storage unit 1-12, and a data writing instruction is given to the storage device group control unit 3-4 so that data a-52, a-56, a-60, and a-64 are stored in the storage device 1-16.

(10) The data writing unit 18 informs the storage positions of data a-1 to a-64 to the virtual storage device group control unit 9, and the virtual storage device group control unit 9 adds the positional information of the stored data to virtual storage device group control table 12.

In the data transfer system according to this seventh embodiment of the invention, data are equally stored in the storage devices 1-1 to 1-16 at a high speed, without putting a load on the virtual storage device group control unit 9.

While in this seventh embodiment data are divided into blocks each having the size of a transfer packet, data may be divided into blocks each having a size obtained by dividing the size of the data readout request from the terminal by the number of the high-speed data transfer units.

As described above, in the data transfer system according to the present invention, data are equally divided and stored in storage devices within each virtual storage device group and, in each respective high-speed data transfer units, the storage device group control unit reads out the data and sends the data to the buffer memory, and the transfer control unit transfers the data in the buffer memory to the terminal. Therefore, the load for the data transfer processing can be equally distributed among a plurality of high-speed data transfer units.

In the foregoing description, each virtual storage device group is constituted using one storage device included in each high-speed data transfer unit. More specifically, it comprises four storage devices, each of which is included in each high-speed data transfer unit. However, the structure of the virtual storage device group is not restricted thereto. That is, a virtual storage device group may be constituted by two or more storage devices included in each high-speed data transfer unit.

Furthermore, in the foregoing description, the virtual storage device group control unit, the instruction conversion unit, and other unit are realized by hardware, similar functions may be realized by software using a computer.

What is claimed is:

1. A data transfer system comprising:
    a plurality of terminals;
    a plurality of high-speed data transfer units connected to the terminals through a network, each data transfer unit comprising a plurality of storage devices and a storage device group control means for controlling readout of data from the storage devices, and dividing and storing data requested by the terminals;
    a plurality of transfer control units whereby data divided by said storage device group control means can be transferred to a terminal from a transfer control unit;
    a virtual storage device group controlling means for controlling readout of data from virtual storage device groups, each virtual storage device group being constructed by selecting a storage device from each high-speed data transfer unit;
    an instruction conversion means for receiving a data readout instruction on the basis of data requests output from the terminals, which instruction is given to the virtual storage device groups, from the virtual storage device control means, and converting the instruction into a data readout instruction to the storage devices from the storage device group control means; and,
    means for dividing data among the high-speed data transfer units according to performance characteristics of each data-transfer unit wherein data is divided so that less data is transferred to a data transfer unit having a lower transfer speed and more data is transferred to a data transfer unit having a higher transfer speed, and
    wherein a data packet is determined by dividing a size of a data request from a terminal by the number of high-speed data transfer units.

2. The data transfer system of claim 1 wherein the virtual storage device groups are constructed by dividing data to be transferred to the terminals into blocks each having a transfer packet size of data to be transferred to the terminals and distributing the data blocks successively to the storage devices.

3. The data transfer system of claim 2 wherein the instruction conversion means includes a pre-read instruction conversion means for converting the data readout instruction from the virtual storage device group control means into a data readout instruction that instructs a pre-read of data of a prescribed size including the requested data.

4. The data transfer system of claim 3 wherein the storage device group control means also controls writing of data;
    each of the terminals includes a data division means for dividing data to be written in the storage devices in the high-speed data transfer units into blocks each having a transfer packet size of data to be transferred to a terminal at the data readout, and transferring the data blocks to the high-speed data transfer units; and
    the system further includes a data writing means for distributing and storing the data from the terminal successively into the storage devices in the high-speed data transfer units and giving positional information of the stored data to the virtual storage device group control means when a data writing request is output from the terminal.

5. The data transfer system of claim 3 wherein the storage device group control means also controls writing of data;
    each of the terminals includes a data division means for dividing data to be written in the storage devices in the high-speed data transfer units into blocks each having a size obtained by dividing a size of data for one transfer request at the data readout with the number of the high-speed data transfer units, and transferring the data blocks to the high-speed data transfer units; and
    the system further includes a data writing means for distributing and storing the data from the terminal successively into the storage devices in the high-speed data transfer units and giving positional information of the stored data to the virtual storage device group control means when a data writing request is output from the terminal.

6. The data transfer system of claim 2 including, when transfer data comprising the requested data and a plurality of communication protocol headers having a hierarchical structure and including a protocol header A and a protocol header B are created, a fitting transfer control means for adding dummy data to the protocol header B included in the protocol headers after the protocol header A so that the total of the data sizes of the protocol headers after the protocol header A and the data size of the requested data is equal to a data size determined by the protocol header A.

7. The data transfer system of claim 2 wherein the storage device group control means also controls writing of data;
    each of the terminals includes a data division means for dividing data to be written in the storage devices in the high-speed data transfer units into blocks each having a transfer packet size of data to be transferred to a terminal at the data readout, and transferring the data blocks to the high-speed data transfer units; and
    the system further includes a data writing means for distributing and storing the data from the terminal successively into the storage devices in the high-speed data transfer units and giving positional information of the stored data to the virtual storage device group control means when a data writing request is output from the terminal.

8. The data transfer system of claim 1 wherein the virtual storage device groups are constructed by dividing data to be transferred to the terminals into blocks each having a size obtained by dividing a size of data for one transfer request with the number of the high-speed data transfer units, and distributing the data blocks successively to the storage devices; and the system further includes a data request conversion means for converting data readout requests from the terminals into data readout requests each having the data size obtained by the division.

9. The data transfer system of claim 8 wherein the instruction conversion means includes an instruction batch converter for converting the data readout instruction from the virtual storage device group control means into a data readout instruction that instructs a pre-read of data of a prescribed size including the requested data.

10. The data transfer system of claim 9 wherein the storage device group control means also controls writing of data;

each of the terminals includes a data division means for dividing data to be written in the storage devices in the high-speed data transfer units into blocks each having a transfer packet size of data to be transferred to a terminal at the data readout, and transferring the data blocks to the high-speed data transfer units; and the system further includes a data writing means for distributing and storing the data from the terminal successively into the storage devices in the high-speed data transfer units and giving positional information of the stored data to the virtual storage device group control means when a data writing request is output from the terminal.

11. The data transfer system of claim 9 wherein the storage device group control means also controls writing of data;

each of the terminals includes a data division means for dividing data to be written in the storage devices in the high-speed data transfer units into blocks each having a size obtained by dividing a size of data for one transfer request at the data readout with the number of the high-speed data transfer units, and transferring the data blocks to the high-speed data transfer units; and the system further includes a data writing means for distributing and storing the data from the terminal successively into the storage devices in the high-speed data transfer units and giving positional information of the stored data to the virtual storage device group control means when a data writing request is output from the terminal.

12. The data transfer system of claim 8 including, when transfer data comprising the requested data and a plurality of communication protocol headers having a hierarchical structure and including a protocol header A and a protocol header B are created, a fitting transfer control means for adding dummy data to the protocol header B included in the protocol headers after the protocol header A so that the total of the data sizes of the protocol headers after the protocol header A and the data size of the requested data is equal to a data size determined by the protocol header A.

13. The data transfer system of claim 8 wherein the storage device group control means also controls writing of data;

each of the terminals includes a data division means for dividing data to be written in the storage devices in the high-speed data transfer units into blocks each having a size obtained by dividing a size of data for one transfer request at the data readout with the number of the high-speed data transfer units, and transferring the data blocks to the high-speed data transfer units; and the system further includes a data writing means for distributing and storing the data from the terminal successively into the storage devices in the high-speed data transfer units and giving positional information of the stored data to the virtual storage device group control means when a data writing request is output from the terminal.

14. The data transfer system of claim 1 wherein the storage device group control means also controls writing of data;

each of the terminals includes a data division means for dividing data to be written in the storage devices in the high-speed data transfer units into blocks each having a transfer packet size of data to be transferred to the terminal at a data readout, and transferring the data blocks to the high-speed data transfer units; and the system further includes a data writing means for distributing and storing the data from the terminal successively into the storage devices in the high-speed data transfer units and giving positional information of the stored data to the virtual storage device group control means when a data writing request is output from the terminal.

15. The data transfer system of claim 1 wherein the storage device group control means also controls writing of data;

each of the terminals includes a data division means for dividing data to be written in the storage devices in the high-speed data transfer units into blocks each having a size obtained by dividing a size of data for one transfer request at the data readout with the number of the high-speed data transfer units, and transferring the data blocks to the high-speed data transfer units; and the system further includes a data writing means for distributing and storing the data from the terminal successively into the storage devices in the high-speed data transfer units and giving positional information of the stored data to the virtual storage device group control means when a data writing request is output from the terminal.

* * * * *